(12) United States Patent
    Cho et al.

(10) Patent No.:    US 12,636,597 B2
(45) Date of Patent:        May 26, 2026

(54) EQUIPMENT FOR TREATING SUBSTRATE INCLUDING A CHEMICAL SOLUTION SUPPLY APPARATUS WITH PUMP MEMBER AND EXTRACTION NOZZLE

(71) Applicant: SEMES CO., LTD., Cheonan-si (KR)

(72) Inventors: A Rah Cho, Daejeon (KR); Woo Sin Jung, Cheonan-si (KR); Hae Kyung Kim, Cheonan-si (KR); Dae Sung Kim, Cheonan-si (KR)

(73) Assignee: SEMES CO., LTD., Cheonan-si (KR)

( * ) Notice:    Subject to any disclaimer, the term of this patent is extended or adjusted under 35 U.S.C. 154(b) by 586 days.

(21) Appl. No.: 18/145,952

(22) Filed:    Dec. 23, 2022

(65)            Prior Publication Data

US 2023/0201844 A1        Jun. 29, 2023

(30)        Foreign Application Priority Data

Dec. 27, 2021    (KR) ........................ 10-2021-0189007

(51) Int. Cl.
    *B05B 15/50*            (2018.01)
    *B01D 19/00*            (2006.01)
            (Continued)
(52) U.S. Cl.
    CPC ..... *B01D 19/0036* (2013.01); *B01D 19/0047* (2013.01); *B05B 1/005* (2013.01);
            (Continued)
(58) Field of Classification Search
    CPC ................ B01D 19/00; B01D 19/0005; B01D 19/0036; B01D 19/0042; B01D 19/0078; C02F 1/20; H01L 21/6715
            (Continued)

(56)            References Cited

U.S. PATENT DOCUMENTS

2006/0267455 A1* 11/2006 Phillips .............. B01D 19/0094
                                        310/328
2006/0283328 A1* 12/2006 Saiki ........................ B08B 3/12
                                        96/289
            (Continued)

FOREIGN PATENT DOCUMENTS

JP        2000-045952 A        2/2000
JP        2000-097157 A        4/2000
            (Continued)

OTHER PUBLICATIONS

Korean Office Action, dated Aug. 11, 2023, issued in corresponding Korean Patent Application No. 10-2021-0189007.
            (Continued)

*Primary Examiner* — Karl Kurple
(74) *Attorney, Agent, or Firm* — Harness, Dickey & Pierce, P.L.C

(57)            ABSTRACT

Provided is an equipment for treating a substrate. The substrate treating equipment may include: a nozzle supplying a chemical solution to a substrate; and a chemical solution supply apparatus supplying the chemical solution to the nozzle, and the chemical solution supply apparatus may include a pump member, an extraction nozzle provided on a flow path through which the chemical solution is introduced into the pump member and spraying the chemical solution by a spray scheme, and a control unit controlling an operation of the pump member.

8 Claims, 15 Drawing Sheets

(51) Int. Cl.

| | |
|---|---|
| *B05B 1/00* | (2006.01) |
| *B05B 12/08* | (2006.01) |
| *B05B 15/20* | (2018.01) |

(52) U.S. Cl.
CPC ............ *B05B 12/088* (2013.01); *B05B 15/20*
(2018.02); *B05B 15/50* (2018.02)

(58) Field of Classification Search
USPC .............. 95/266, 19, 248, 260–261; 210/188
See application file for complete search history.

(56) References Cited

U.S. PATENT DOCUMENTS

| | | | | |
|---|---|---|---|---|
| 2008/0210097 A1* | 9/2008 | Washio | .............. | B01D 19/0036 |
| | | | | 96/244 |
| 2009/0303283 A1* | 12/2009 | Nakano | .................... | B41J 2/175 |
| | | | | 347/92 |
| 2010/0309262 A1* | 12/2010 | Nakano | ............... | B41J 2/16585 |
| | | | | 347/85 |
| 2014/0007619 A1* | 1/2014 | Brown | .................... | C03B 21/02 |
| | | | | 65/29.11 |
| 2015/0096441 A1* | 4/2015 | Iseki | .................. | B01D 19/0063 |
| | | | | 96/219 |

| | | | | |
|---|---|---|---|---|
| 2016/0243466 A1* | 8/2016 | Skoglund | ........... | B01D 19/0036 |
| 2016/0288032 A1* | 10/2016 | Shite | ................... | H01L 21/6715 |
| 2021/0356867 A1 | 11/2021 | Dong | | |
| 2025/0005737 A1* | 1/2025 | Shimoaoki | ............. | G06T 7/001 |

FOREIGN PATENT DOCUMENTS

| | | | |
|---|---|---|---|
| JP | 3764280 | B2 | 4/2006 |
| JP | 2007-029944 | A | 2/2007 |
| JP | 2011-169244 | A | 9/2011 |
| JP | 2012-086176 | A | 5/2012 |
| JP | 2015-073915 | A | 4/2015 |
| JP | 2019125628 | A | 7/2019 |
| KR | 10-20010002452 | A | 1/2001 |
| KR | 10-20030090685 | A | 11/2003 |
| KR | 100905255 | B1 | 6/2009 |
| KR | 10-20090070222 | A | 7/2009 |
| KR | 101440756 | B1 | 9/2014 |
| KR | 10-20180041100 | A | 4/2018 |
| KR | 102004556 | B1 | 7/2019 |

OTHER PUBLICATIONS

Office Action dated Dec. 26, 2023 issued in corresponding Japanese
Patent Application No. 2022-207050.

* cited by examiner

FIG. 10

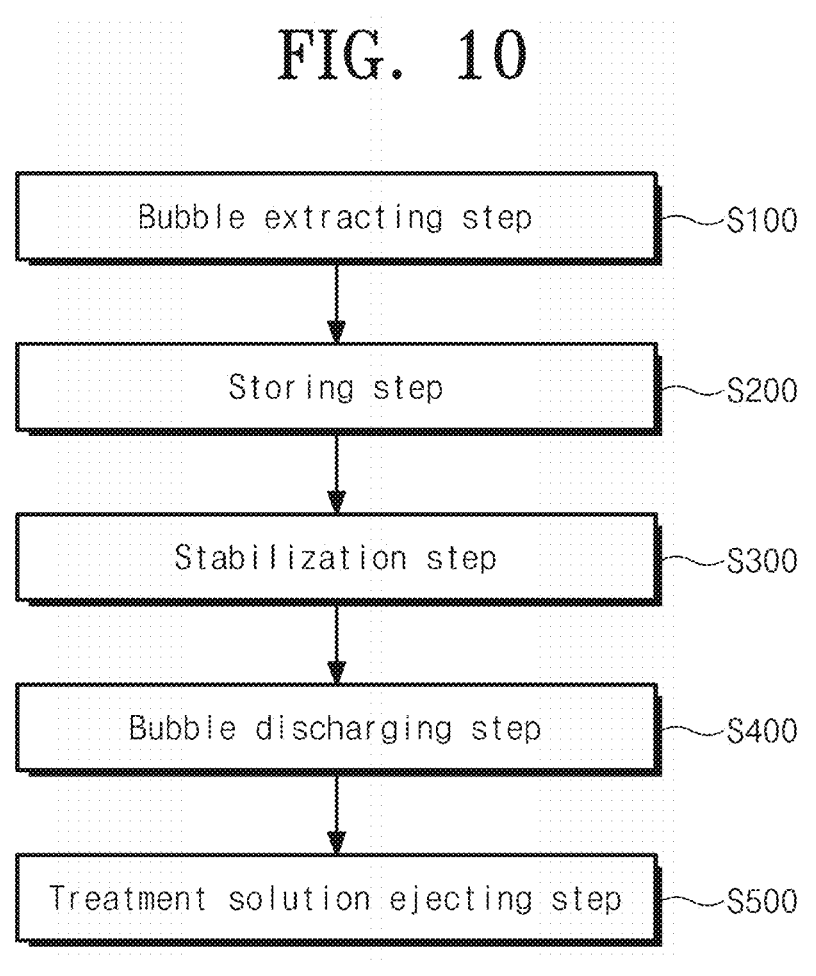

| Bubble extracting step | ~S100 |
| Storing step | ~S200 |
| Stabilization step | ~S300 |
| Bubble discharging step | ~S400 |
| Treatment solution ejecting step | ~S500 |

EQUIPMENT FOR TREATING SUBSTRATE INCLUDING A CHEMICAL SOLUTION SUPPLY APPARATUS WITH PUMP MEMBER AND EXTRACTION NOZZLE

CROSS-REFERENCE TO RELATED APPLICATIONS

This application claims priority to and the benefit of Korean Patent Application No. 10-2021-0189007 filed in the Korean Intellectual Property Office on Dec. 27, 2021, the entire contents of which are incorporated herein by reference.

TECHNICAL FIELD

The present invention relates to a substrate treating equipment and a treatment solution bubble removing method which remove a bubble in a treatment solution in an equipment for solution-treating a substrate with a treatment solution.

BACKGROUND ART

Among semiconductor manufacturing processes, a photolithography process is a process of forming a desired pattern on a wafer. The photolithography process is generally conducted in a spinner local facility connected to an exposure facility and consecutively treating an application process, an exposure process, and a development process. The spinner local facility sequentially or selectively performs a hexamethyl disilazane (HMDS) process, the application process, a bake process, and the development process.

In a treatment solution supply apparatus in a treatment equipment in which a general application process is performed, each degassing apparatus is installed on a supply line connecting a pump and a nozzle, and the treatment solution supplied to the nozzle of a solution treatment apparatus is supplied to the nozzle after the bubble is removed by the degassing apparatus.

Since a general degassing apparatus used in a semiconductor process is a method for extracting the bubble by pulling a thin layer (gas permeation layer) with vacuum, there is a problem in that a load is continuously applied to a thin layer, which cases damage occurs after a predetermined time. In addition, when a force of pulling with the vacuum is increased, the thin layer (gas permeation layer) is easily torn, so the bubble in the treatment solution should be extracted with a minimum of vacuum. Therefore, there is a problem in that a flow rate is limited in order to maintain a predetermined level of degassing efficiency. As a result, the degassing apparatus should be disposed close to an ejection unit (nozzle) having a small flow rate, and an area exposed to the vacuum should also be maintained at a predetermined degree, so there is also a disadvantage in that a size cannot be reduced.

Further, the degassing apparatus can damage an ejector part and a vacuum pump that controls the vacuum due to a problem in that the treatment solution passes through the gas permeation layer in the process of removing the bubble, so a separate drain pump is required.

SUMMARY OF THE INVENTION

The present invention has been made in an effort to provide an equipment for treating a substrate and a treatment solution bubble removing method which are easily maintained.

The present invention has been made in an effort to provide an equipment for treating a substrate and a treatment solution bubble removing method which can effectively remove a dissolved gas in a treatment solution.

The present invention has been made in an effort to provide an equipment for treating a substrate and a treatment solution bubble removing method which can remove a bubble in the treatment solution at a front end of a pump unit.

The present invention has been made in an effort to provide an equipment for treating a substrate and a treatment solution bubble removing method which are capable of supplying a sufficient flow rate.

A problem to be solved by the present invention is not limited to the above-described problem. Other technical problems not mentioned may be apparently appreciated by those skilled in the art from the following description.

An exemplary embodiment of the present invention provides an equipment for treating a substrate, which includes: a nozzle supplying a chemical solution to a substrate; and a chemical solution supply apparatus supplying the chemical solution to the nozzle, and the chemical solution supply apparatus includes a pump member, an extraction nozzle provided on a flow path through which the chemical solution is introduced into the pump member and spraying the chemical solution by a spray scheme, and a control unit controlling an operation of the pump member.

Further, the dissolved gas extraction nozzle may include a nozzle body having a central flow path through which the chemical solution flows formed therein, and the central flow path may have a cross-sectional area relatively smaller than a cross-sectional area of a pipe connected to the nozzle body so that a dissolved gas in the chemical solution is extracted in the form of the bubble.

Further, the dissolved gas extraction nozzle may include a nozzle body having a central flow path through which the chemical solution flows formed therein, the central flow path may include an introduction hole through which the chemical solution is introduced at one side and an ejection hole through which the chemical solution is ejected at the other side, and the ejection hole may have a cross-sectional area relatively smaller than a cross-sectional area of a pipe connected to the ejection hole so that the dissolved gas in the chemical solution is extracted in the form of the bubble through a cavitation phenomenon.

Further, the cross-sectional area of the central flow path may be the same as the cross-sectional areas of the ejection hole and the introduction hole.

Further, the nozzle body may include a first connection portion for connecting the pipe to the introduction hole, and a second connection portion for connecting the pipe to the ejection hole.

Further, the ejection hole of the nozzle body may be directly connected to the introduction port of the pump member.

Further, the pump member may include a pump case, and a bellows pump having one end airtightly fixed to the pump case, provides a storage space from the pump case, and contracted or expanded by a pressure control fluid.

Further, the pump case may be provided so that an ejection port through which the chemical solution stored in the storage space is ejected protrudes toward the storage space.

Further, the control unit may include a storing operation of storing the chemical solution in the pump member through the dissolved gas extraction nozzle, a bubble discharging operation of discharging the bubble separated from the chemical solution in the pump member after the storing operation, and an ejection operation of ejecting the chemical solution form which the bubble is removed from the pump member after the bubble discharging operation.

Further, the control unit may reduce a volume of the pump by pressurizing the pump member when executing the bubble discharging operation and the ejection operation.

Further, the control unit may further include a stabilization operation of allowing the bubble to be separated from the chemical solution between the storing operation and the bubble discharging operation.

Another exemplary embodiment of the present invention provides a method for removing a bubble of a chemical solution, which includes: extracting a dissolved gas from a chemical solution including the dissolved gas in the form of a bubble through a dissolved gas extraction nozzle; storing the chemical solution from which the dissolved gas is extracted in the form of the bubble in a storage space; discharging the bubble separated from the chemical solution in the storage space; and ejecting the chemical solution form which the bubble is removed from the pump member after the bubble discharging.

Further, the method may further include stabilizing of waiting for a predetermined time so as to separate the bubble from the chemical solution before the bubble discharging.

Further, in the extracting, the dissolved gas in the chemical solution may be extracted in the form of the bubble through a cavitation phenomenon, and in the ejecting, an inlet of an ejection port through which the chemical solution is ejected may be formed to protrude toward the storage space in order to prevent the bubble which remains at an upper portion of the storage space from being ejected.

Yet another exemplary embodiment of the present invention provides an equipment for treating a substrate, which includes: a nozzle supplying a chemical solution to a substrate; and a chemical solution supply apparatus supplying the chemical solution to the nozzle, and the chemical solution supply apparatus includes a pump member including a pump case, and a bellows pump having one end airtightly fixed to the pump case, provides a storage space from the pump case, and contracted or expanded by a pressure control fluid, a dissolved gas extraction nozzle provided on a flow path through which the chemical solution is introduced into the pump member and spraying the chemical solution by a spray scheme, and a control unit controlling an operation of the pump member, and the control unit includes a storing operation of storing the chemical solution in the pump member through the dissolved gas extraction nozzle, a bubble discharging operation of discharging the bubble separated from the chemical solution in the pump member after the storing operation, and an ejection operation of ejecting the chemical solution form which the bubble is removed from the pump member after the bubble discharging operation.

Further, the dissolved gas extraction nozzle may include a nozzle body having a central flow path through which the chemical solution flows formed therein, and the central flow path may have a cross-sectional area relatively smaller than a cross-sectional area of a pipe connected to the nozzle body so that a dissolved gas in the chemical solution is extracted in the form of the bubble.

Further, the central flow path of the nozzle body may be directly connected to the introduction port of the pump member.

Further, the pump case may be provided so that an ejection port through which the chemical solution stored in the storage space is ejected protrudes toward the storage space.

Further, the control unit may reduce a volume of the pump by providing a pressurizing gas to the pump member when executing the bubble discharging operation and the ejection operation.

Further, the control unit may further include a stabilization operation of allowing the bubble to be separated from the chemical solution between the storing operation and the bubble discharging operation.

According to an exemplary embodiment of the present invention, a bubble in a treatment solution is removed from a pump unit, and as a result, it is free from limiting a supply flow rate to a nozzle.

According to an exemplary embodiment of the present invention, spatial and cost reduction can be expected as compared with the related art in which a degassing apparatus is individually disposed on a supply line connected to the nozzle.

According to an exemplary embodiment of the present invention, a dissolved gas is extracted from a dissolved gas extraction nozzle in the form of the bubble by using a cavitation phenomenon to semi-permanently use the present invention, so maintenance cost is not separately generated.

According to an exemplary embodiment of the present invention, the dissolved gas in the treatment solution is effectively extracted to be separate and removed.

According to an exemplary embodiment of the present invention, it is possible to supply a sufficient flow rate.

The effect of the present invention is not limited to the foregoing effects. Non-mentioned effects will be clearly understood by those skilled in the art from the present specification and the accompanying drawings.

BRIEF DESCRIPTION OF THE DRAWINGS

FIG. 10 is a flowchart for describing a method for removing a bubble in the treatment solution supply apparatus.

DETAILED DESCRIPTION

Figure 1:
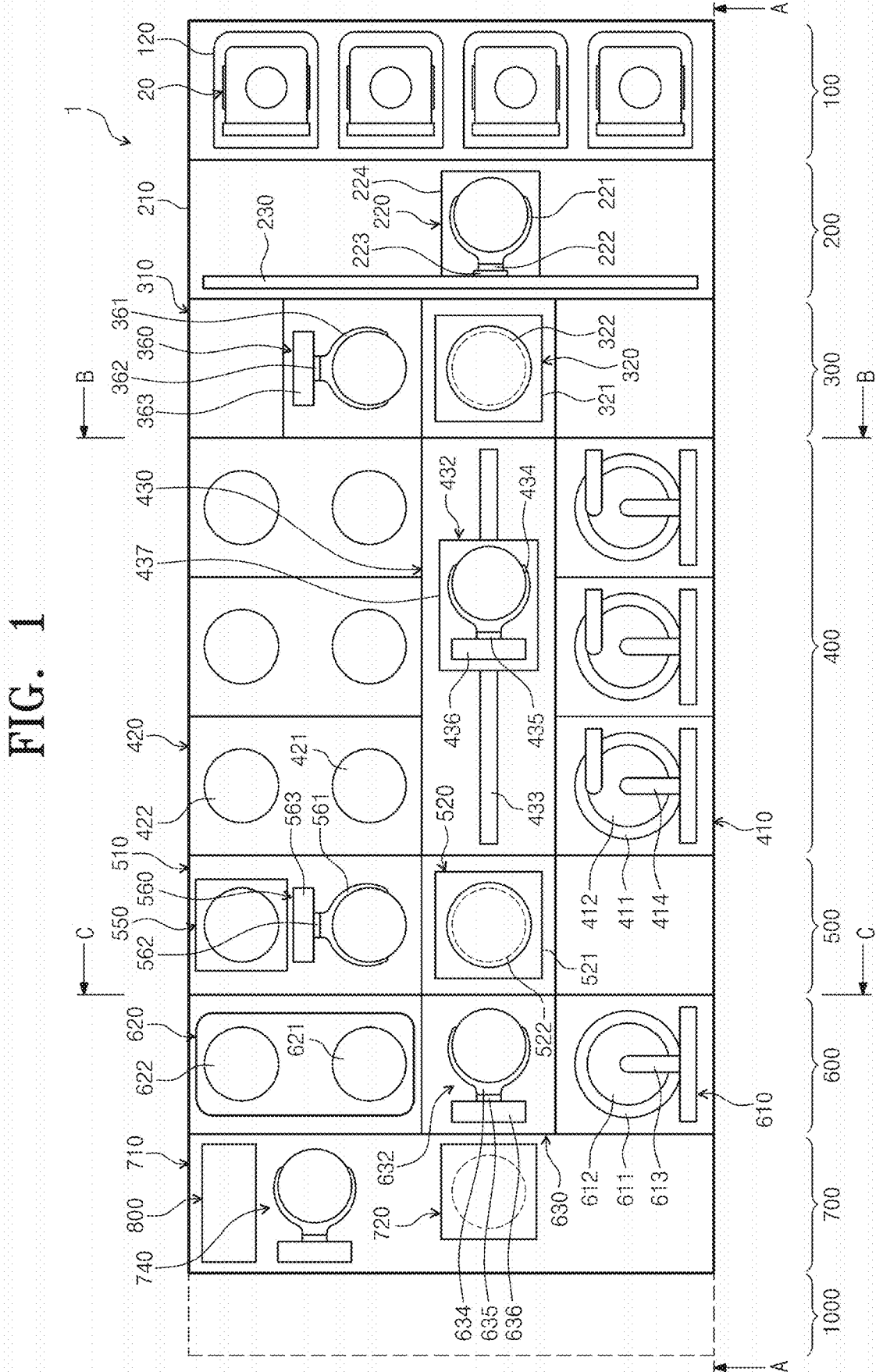
FIG. 1 is a plan view of a substrate treatment facility according to a first exemplary embodiment of the present invention.

In the following detailed description, exemplary embodiments of the present invention have been shown and described, simply by way of illustration. As those skilled in the art would realize, the described exemplary embodiments may be modified in various different ways, all without departing from the spirit or scope of the present invention. In the following description of the present invention, a detailed description of known functions and configurations incorporated herein is omitted to avoid making the subject matter of the present invention unclear. Further, the same reference numeral is used for a part which performs a similar function and a similar action through all drawings.

Unless explicitly described to the contrary, the word "include" and variations such as "includes" or "including" will be understood to imply the inclusion of stated elements but not the exclusion of any other elements. Specifically, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Terms including as first, second, and the like are used for describing various components, but the components should not be limited by the terms. The terms are used only to discriminate one element from another element. For example, a first component may be referred to as a second component, and similarly, the second component may be referred to as the first component without departing from the scope of the present invention.

A singular form includes a plural form if there is no clearly opposite meaning in the context. Further, shapes, sizes, and the like of elements in the drawings may be exaggerated for clearer explanation.

A facility of the exemplary embodiment may be used for performing a photolithography process for a substrate such as a semiconductor wafer or a flat panel display panel. In particular, the facility of the exemplary embodiment may be connected to an exposure apparatus, and used for performing an application process and a development process for a substrate. Hereinafter, a case where a wafer is used as the substrate will be described as an example.

Hereinafter, a substrate treatment facility of the present invention will be described with reference to FIGS. 1 to 15.

Figure 2:
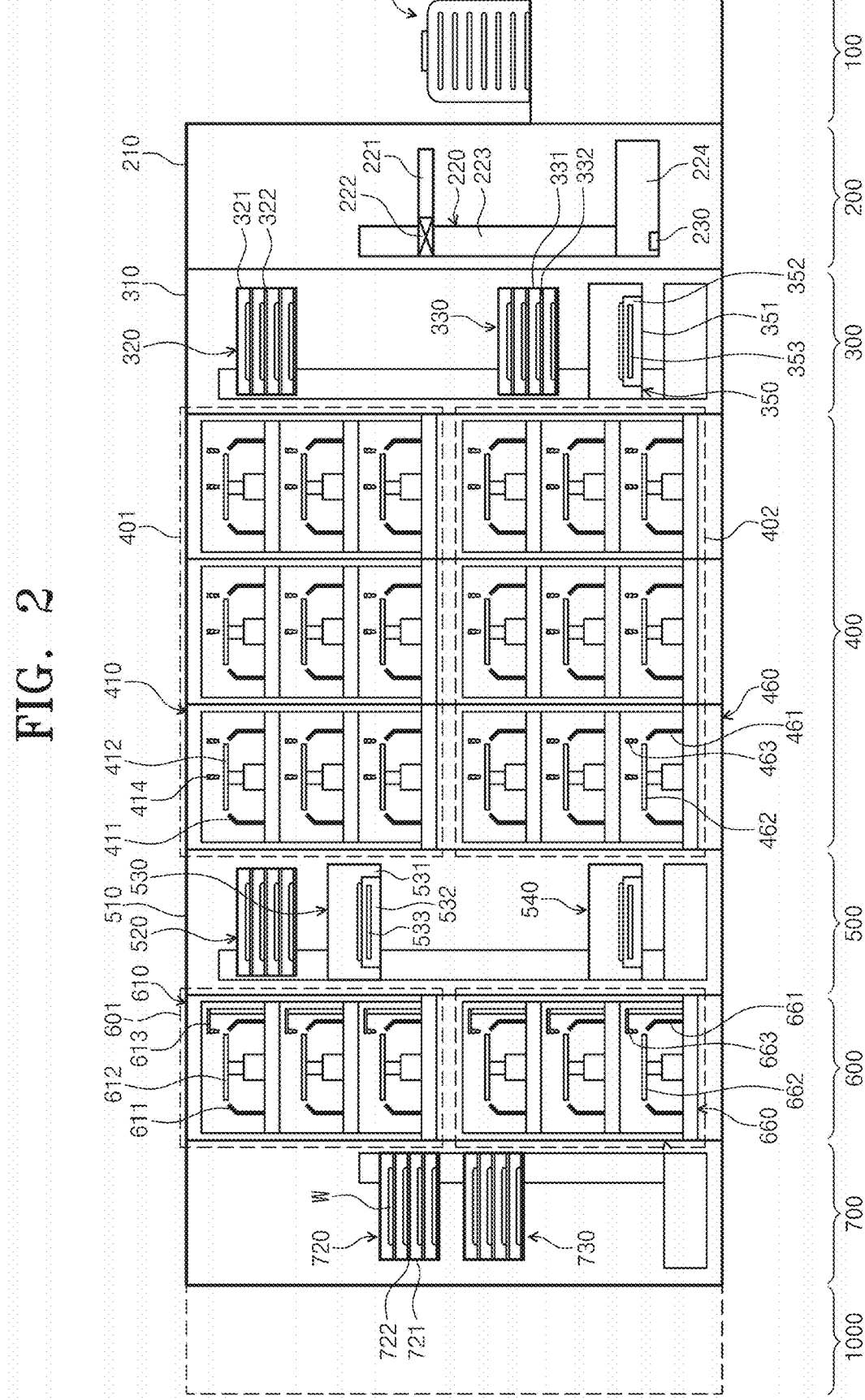
FIG. 2 is a cross-sectional view of the facility of FIG. 1 taken along line A-A.
Figure 3:
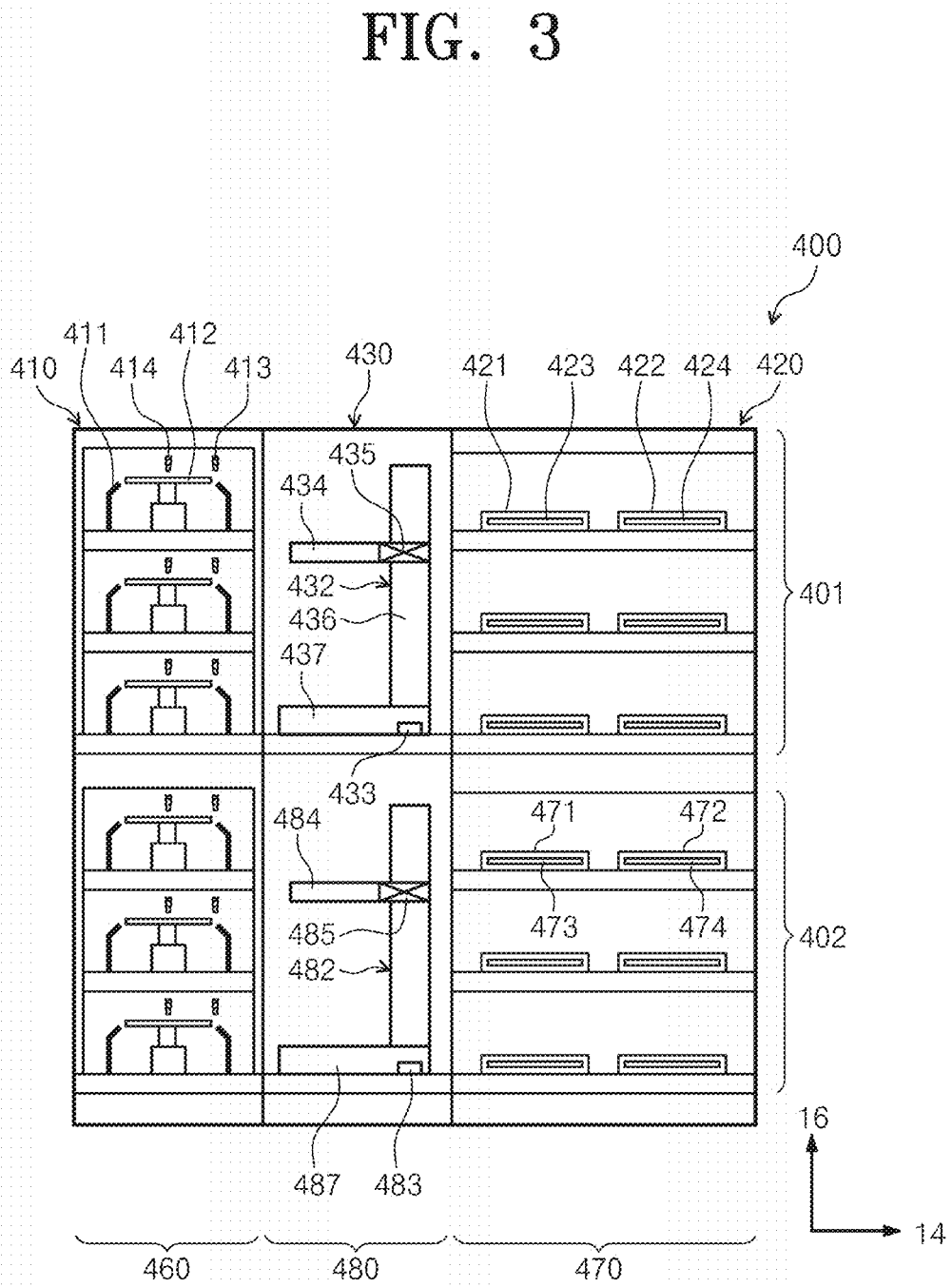
FIG. 3 is a cross-sectional view of the facility of FIG. 1 taken along line B-B.
Figure 4:
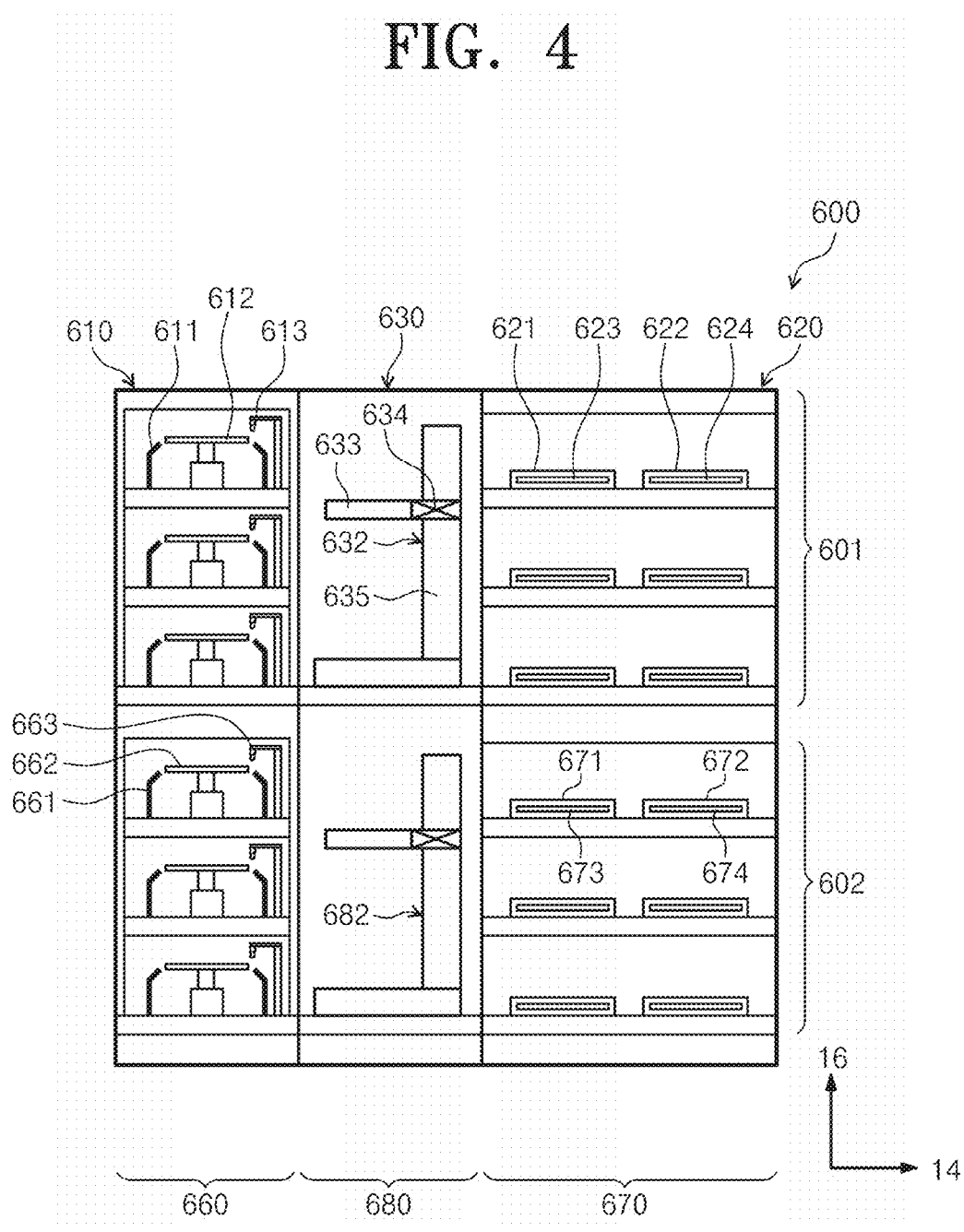
FIG. 4 is a cross-sectional view of the facility of FIG. 1 taken along line C-C.

FIG. 1 is a plan view of a substrate treatment facility according to an exemplary embodiment of the present invention, FIG. 2 is a cross-sectional view of the facility of FIG. 1 taken along line A-A, FIG. 3 is a cross-sectional view of the facility of FIG. 1 taken along line B-B, and FIG. 4 is a cross-sectional view of the facility of FIG. 1 taken along line C-C.

Referring to FIGS. 1 to 4, the substrate treatment facility 1 may include a load port 100, an index module 200, a first buffer module 300, an application and development module 400, a second buffer module 500, an exposure pre-post treatment module 600, and an interface module 700. The load port 100, the index module 200, the first buffer module 300, the application and development module 400, the second buffer module 500, the exposure pre-post treatment module 600, and the interface module 700 may be sequentially arranged in line in one direction.

Hereinafter, a direction in which load port 100, the index module 200, the first buffer module 300, the application and development module 400, the second buffer module 500, the exposure pre-post treatment module 600, and the interface module 700 are arranged will be referred to as a first direction 12, a direction vertical to the first direction 12 when viewed from the top will be referred to as a second direction 14, and a direction vertical to each of the first direction 12 and the second direction 14 will be referred to as a third direction 16.

A substrate W is moved while being stored in a cassette 20. In this case, the cassette 20 has a structure which may be sealed from the outside. For example, a front open unified pod (FOUP) having a door at a front may be used as the cassette 20.

Hereinafter, the load port 100, the index module 200, the first buffer module 300, the application and development module 400, the second buffer module 500, the exposure pre-post treatment module 600, and the interface module 700 will be described in detail.

The load port 100 has a mounting table 120 on which the cassette 20 storing the substrates W is placed. A plurality of mounting tables 120 is provided, and the mounting tables 200 are arranged in line in the second direction 14. In FIG. 1, four mounting tables 120 are provided.

The index module 200 transfers the substrate W between the cassette 20 placed on the mounting table 120 and the first buffer module 300. The index module 200 has a frame 210, an index robot 220, and a guide rail 230. The frame 210 is generally provided in a rectangular parallelepiped shape in which an inside is empty, and is placed between the load port 100 and the first buffer module 300. The frame 210 of the index module 200 may be provided at a height lower than the frame 310 of the first buffer module 300 to be described below. The index robot 220 and the guide rail 230 are placed in the frame 210. The index robot 220 has a structure in which 4-axis driving is possible so that a hand 221 directly handling the substrate W is movable and rotatable in the first direction 12, the second direction 14, and the third direction 16. The index robot 220 has a hand 221, an arm 222, a support 223, and a bracket 224. The hand 221 is fixedly installed in the arm 222. The arm 222 is provided in a stretchable structure and a rotatable structure. The support 223 is placed in the third direction 16 which is a longitudinal direction thereof. The arm 222 is coupled to the support 223 to be movable along the support 223. The support 223 is fixedly coupled to the bracket 224. The guide rail 230 is provided to be placed in the second direction 14 which is the longitudinal direction thereof. The bracket 224 is coupled to the guide rail 230 to be linearly movable along the guide rail 230. Further, although not illustrated, a door opener opening/closing a door of the cassette 20 is further provided in the frame 210.

The first buffer module 300 includes a frame 310, a first buffer 320, a second buffer 330, a cooling chamber 350, and a first buffer robot 360. The frame 310 is generally provided in the rectangular parallelepiped shape in which the inside is empty, and is placed between the index module 300 and the application and development module 400. The first buffer 320, the second buffer 330, the cooling chamber 350, and the first buffer robot 360 are positioned in the frame 310. The cooling chamber 350, the second buffer 330, and the first buffer 320 are arranged in the third direction 16 from the bottom in sequence. The first buffer 320 is positioned at a height corresponding to an application module 401 of the application and development module 400 to be described below, and the second buffer 330 and the cooling chamber 350 are positioned at a height corresponding to a development module 402 of the application and development module 400 to be described below. The first buffer robot 360 is positioned to be spaced apart from the second buffer 330, the cooling chamber 350, and the first buffer 320 by a predetermined distance in the second direction 14.

Each of the first buffer 320 and the second buffer 330 temporarily keeps a plurality of substrates W. The second buffer 330 includes a housing 331 and a plurality of supports 332. The supports 332 are placed in the housing 331, and provided to be spaced apart from each other in the third direction 16. One substrate W is placed on each support 332. The housing 331 has an opening (not illustrated) in a direction in which the index robot 220 is provided, a direction in which the first buffer robot 360 is provided, and a direction in which a development unit robot 482 is provided so that the index robot 22, the first buffer robot 360, and the development unit robot 482 of the development module 402 to be described below may load or unload the substrate W on or from the support 332 in the housing 331. The first buffer 320 has a substantially similar structure to the second buffer 330. However, the housing 321 of the first buffer 320 has the opening in the direction in which the first buffer robot 360 is provided and a direction in which an application unit robot 432 positioned in the application module 401 to be described below is provided. The number of supports 322 provided in the first buffer 320 and the number of supports 332 provided in the second buffer 330 may be the same as or different from each other. According to an example, the number of supports 332 provided in the second buffer 330 may be larger than the number of supports 322 provided in the first buffer 320.

The first buffer robot 360 transfers the substrate W between the first buffer 320 and the second buffer 330. The first buffer robot 360 has a hand 361, an arm 362, and a support 363. The hand 361 is fixedly installed in the arm 362. The arm 362 is provided in the stretchable structure to allow the had 361 to be movable in the second direction 14. The arm 362 is coupled to the support 363 to be linearly movable along the support 363 in the third direction 16. The support 363 has an extension length from a location corresponding to the second buffer 330 to a location corresponding to the first buffer 320. The support 363 may be provided to be longer than the extension length upward or downward. The first buffer robot 360 may be just provided so that the hand 361 is 2-axially driven in the second direction 14 and the third direction 16.

The cooling chamber 350 cools each substrate W. The cooling chamber 350 includes a housing 351 and a cooling plate 352. The cooling plate 352 has a cooling means 353 that cools an upper surface on which the substrate W is placed and the substrate W. As the cooling means 353, various schemes such as cooling by cooling water or cooling using a thermoelectric element may be used. Further, a lift pin assembly (not illustrated) that locates the substrate W on the cooling plate 352 may be provided in the cooling chamber 350. The housing 351 has an opening (not illustrated) in the direction in which the index robot 220 is provided and the direction in which the development unit robot 482 is provided so that the index robot 220, and the development unit robot 482 provided in the development module 402 to be described below may load or unload the substrate W on or from the cooling plate 352. Further, doors (not illustrated) that open/close the opening may be provided in the cooling chamber 350.

The application and development module 400 performs a process of applying a photoresist onto the substrate W after the exposure process and a process of developing the substrate W after the exposure process. The application and development module 400 has the substantially rectangular parallelepiped shape. The application and development module 400 includes the application module 401 and the development module 402. The application module 401 and the development module 402 are placed to be partitioned from each other by a layer. According to an example, the application module 401 is positioned above the development module 402.

The application module 401 includes a process of applying a photosensitive solution such as the photoresist to the substrate W and a heat treatment process such as heating and cooling for the substrate W before and after the resist application process. The application module 401 includes a resist application chamber 410, a bake chamber 420, and a transfer chamber 430. The resist application chamber 410, the bake chamber 420, and the transfer chamber 430 may be sequentially arranged in the second direction 14. Therefore, the resist application chamber 410 and the bake chamber 420 are positioned to be spaced apart from each other with the transfer chamber 430 interposed therebetween in the second direction 14. A plurality of resist application chambers 410 is provided, and provided in each of the first direction 12 and the second direction 16. In the drawing, an example in which six resist application chambers 410 are provided is illustrated. A plurality of bake chambers 420 is provided in each of the first direction 12 and the third direction 16. In the drawing, an example in which six bake chambers 420 are provided is illustrated. However, unlike this, more bake chambers 420 may be provided.

The transfer chamber 420 is positioned in line with the first buffer 320 of the first buffer module 300 in the first direction 12. An application unit robot 432 and a guide rail 433 are positioned in the transfer chamber 430. The transfer chamber 430 has a substantially rectangular shape. The application unit robot 432 transfers the substrate W between bake chambers 420, resist application chambers 410, the first buffer 320 of the first buffer module 300, and the a first cooling chamber 520 of the second buffer module 500 to be described below. The guide rail 433 is placed so that the longitudinal direction is in line with the first direction 12. The guide rail 433 guides the application unit robot 432 to linearly move in the first direction 12. The application unit robot 432 has a hand 434, an arm 435, a support 436, and a bracket 437. The hand 434 is fixedly installed in the arm 435. The arm 435 is provided in the stretchable structure to allow the hand 434 to be movable in the horizontal direction. The support 436 is provided to be placed in the third direction 16 which is the longitudinal direction thereof. The arm 435 is coupled to the support 436 to be linearly movable along the support 436 in the third direction 16. The support 436 is fixedly coupled to the bracket 437, and the bracket 437 is coupled to the guide rail 433 to be linearly movable along the guide rail 433.

All of the resist application chambers 410 have the same structure. However, the types of photoresists used in the respective resist application chambers 410 may be different from each other. As an example, as the photoresist, a chemical amplification resist may be used. The resist application chamber 410 applies the photoresist onto the substrate W.

The resist application chamber 410 has a housing 411, a support plate 412, and a nozzle 413. The housing 411 may have a cup shape of which an upper portion is opened. The support plate 412 is positioned in the housing 411, and supports the substrate W. The support plate 412 is provided to be rotatable. The nozzle 413 supplies a photoresist onto the substrate W placed on the support plate 412. The nozzle 413 may have a circular tube shape, and supply the photoresist to the center of the substrate W. Optionally, the nozzle 413 may have a length corresponding to a diameter of the substrate W, and the ejection hole of the nozzle 413 may be provided as a slit. Further, additionally, a nozzle 414 supplying a cleaning solution such as deionized water may be further provided in the photoresist chamber 410 in order to clean the surface of the substrate W to which the photoresist is supplied.

Referring back to FIGS. 1 to 4, the bake chamber 420 heat-treats the substrate W. For example, the bake chambers 420 performs a pre-bake process of removing an inorganic substance or moisture from the surface of the substrate W by heating the substrate W at a predetermined temperature before applying the photoresist or a soft bake process performed after applying the photoresist onto the substrate W, and performs a cooling process of cooling the substrate W after each heating process. The bake chamber 420 has a cooling plate 421 or a heating plate 422. A cooling means 423 such as cooling water or a thermoelectric element is provided in the cooling plate 421. Further, a cooling means 422 such as a heat wire or the thermoelectric element is provided in the heating plate 424. Each of the cooling plate 421 and the heating plate 422 may be provided in one bake chamber 420. Optionally, some of the bake chambers 420 may include only the cooling plate 421, and the other some may include only the heating plate 422.

The development module 402 includes a development process of removing a part of the photoresist by supplying a development solution onto the substrate W in order to obtain a pattern, and a heat-treatment process such as heating and cooling performed with respect to the substrate W before and after the development process. The development module 402 includes a development chamber 460, a bake chamber 470, and a transfer chamber 480. The development chamber 460, the bake chamber 470, and the transfer chamber 480 may be sequentially arranged in the second direction 14. Therefore, the development chamber 460 and the bake chamber 470 are positioned to be spaced apart from each other with the transfer chamber 480 interposed therebetween in the second direction 14. A plurality of development chambers 460 is provided, and provided in each of the first direction 12 and the second direction 16. In the drawing, an example in which six development chambers 460 are provided is illustrated. A plurality of bake chambers 470 is provided in each of the first direction 12 and the third direction 16. In the drawing, an example in which six bake chambers 470 are provided is illustrated. However, unlike this, more bake chambers 470 may be provided.

The transfer chamber 480 is positioned in line with the second buffer 330 of the first buffer module 300 in the first direction 12. A development unit robot 482 and a guide rail 483 are positioned in the transfer chamber 480. The transfer chamber 480 has a substantially rectangular shape. The development unit robot 482 transfers the substrate W between development chambers 460, the second buffer 330 and the cooling chamber 350 of the first buffer module 300, and the second cooling chamber 540 of the second buffer module 500. The guide rail 483 is placed so that the longitudinal direction is in line with the first direction 12. The guide rail 483 guides the development unit robot 482 to linearly move in the first direction 12. The development unit robot 482 has a hand 484, an arm 485, a support 486, and a bracket 487. The hand 484 is fixedly installed in the arm 485. The arm 485 is provided in the stretchable structure to allow the hand 484 to be movable in the horizontal direction. The support 486 is provided to be placed in the third direction 16 which is the longitudinal direction thereof. The arm 485 is coupled to the support 486 to be linearly movable along the support 486 in the third direction 16. The support 486 is fixedly coupled to the bracket 487. The bracket 487 is coupled to the guide rail 483 to be movable along the guide rail 483.

All of the development chambers 460 have the same structure. However, the types of development solutions used in the respective development chambers 460 may be different from each other. The development chamber 460 removes a region to which light is irradiated in the photoresist on the substrate W. In this case, a region to which the light is irradiated in a passivation layer is also removed jointly. Optionally, only a region to which the light is not irradiated the regions of the photoresist and the passivation layer may be removed according to the type of used photoresist.

The development chamber 460 has a container 461, a support plate 462, and a nozzle 463. The housing 461 may have a cup shape of which an upper portion is opened. The support plate 462 is positioned in the housing 461, and supports the substrate W. The support plate 462 is provided to be rotatable. The nozzle 463 supplies the development solution onto the substrate W placed on the support plate 462. The nozzle 463 may have a circular tube shape, and supply the development solution to the center of the substrate W. Optionally, the nozzle 463 may have a length corresponding to a diameter of the substrate W, and the ejection hole of the nozzle 463 may be provided as a slit. Further, a nozzle 464 supplying a cleaning solution such as deionized water may be further provided to the development chamber 460 in order to clean the surface of the substrate W to which the development solution is supplied.

The bake chamber 470 of the development module 402 heat-treats the substrate W. For example, the bake chambers 470 perform a post bake process of heating the substrate W before the development process is performed, a hard bake process of heating the substrate W after the development process is performed, and a cooling process of cooling the heated wafer after each bake process. The bake chamber 470 has a cooling plate 471 or a heating plate 472. A cooling means 471 such as cooling water or a thermoelectric element is provided in the cooling plate 473. Alternatively, a heating means 472 such as the heat wire or the thermoelectric element is provided in the heating plate 474. Each of the cooling plate 471 and the heating plate 472 may be provided in one bake chamber 470. Optionally, some of the bake chambers 470 may include only the cooling plate 471, and the other some may include only the heating plate 472.

As described above, in the application and development module 400, the application module 401 and the development module 402 are provided to be separated from each other. Further, when viewed from the top, the application module 401 and the development module 402 may have the same chamber arrangement.

The second buffer module 500 is provided as a passage through which the substrate W is transported between the application and development module 400 and the exposure pre-post treatment module 600. Further, the second buffer module 500 performs a predetermined process such as a cooling process or an edge exposure process with respect to the substrate W. The second buffer module 500 includes a frame 510, a buffer 520, a first cooling chamber 530, a second cooling chamber 540, an edge exposure chamber 550, and a second buffer robot 560. The frame 510 has the rectangular parallelepiped shape. The buffer 520, the first cooling chamber 530, the second cooling chamber 540, the edge exposure chamber 550, and the second buffer robot 560 are positioned in the frame 510. The buffer 520, the first cooling chamber 530, and the edge exposure chamber 550 are arranged at a height corresponding to the application module 401. The second cooling chamber 540 is placed at a height corresponding to the development module 402. The buffer 520, the first cooling chamber 530, and the second cooling chamber 540 are sequentially arranged in line in the third direction 16. When viewed from the top, the buffer 520 is arranged in the first direction 12 jointly with the transfer chamber 430 of the application module 401. The edge exposure chamber 550 is arranged to be spaced apart from the buffer 520 or the first cooling chamber 530 by a predetermined distance in the second direction 14.

The second buffer robot 560 transports the substrate W between the buffer 520, the first cooling chamber 530, and the edge exposure chamber 550. The second buffer robot 560 is positioned between the edge exposure chamber 550 and the buffer 520. The second buffer robot 560 may be provided in a similar structure to the first buffer robot 360. The first cooling chamber 530 and the edge exposure chamber 550 perform a subsequent process for the wafers W for which the process is performed in the application module 401. The first cooling chamber 530 cools the substrate W for which the process is performed in the application module 401. The first cooling chamber 530 has a similar structure to the cooling chamber 350 of the first buffer module 300. The edge exposure chamber 550 exposes the edges of the wafers W for which the process is performed in the first cooling chamber 530. The buffer 520 temporarily keeps the substrate W before the substrates W for which the process is performed in the edge exposure chamber 550 are transported to a pre-treatment module 601 to be described below. The second cooling chamber 540 cools the wafers W before the wafers W for which the process is performed in a post-treatment module 602 to be described below are transported to the development module 402. The second buffer module 500 may further have an added buffer at a height corresponding to the development module 402. In this case, the wafers W for which the process is performed in a post-treatment module 602 may be temporarily kept in the added buffer, and then transported to the development module 402.

The exposure pre and post-treatment module 600 may treat a process of applying a passivation layer protecting a photoresist film applied to the substrate W upon immersion exposure when an exposure apparatus 1000 performs an immersion exposure process. Further, the exposure pre and post-treatment module 600 may perform a process of cleaning the substrate after the exposure. Further, when the application process is performed by using a chemical amplification type resist, the exposure pre and post-treatment module 600 may perform a post-exposure bake process. The exposure pre and post-treatment module 600 includes a pre-treatment module 601 and a post-treatment module 602. The pre-treatment module 601 performs a process of treating the substrate W before performing the exposure process and the post-treatment module 602 performs a process of treating the substrate after the exposure process. The pre-treatment module 601 and the post-treatment module 602 are placed to be partitioned from each other by the layer. According to an example, the pre-treatment module 601 is positioned above the post-treatment module 602. The pre-treatment module 601 is provided at the same height as the application module 401. The pre-treatment module 602 is provided at the same height as the development module 402. The pre-treatment module 602 includes a passivation layer application chamber 610, a bake chamber 620, and a transfer chamber 630. The passivation layer application chamber 610, the transfer chamber 630, and the bake chamber 620 may be sequentially arranged in the second direction 14. Therefore, the passivation layer application chamber 610 and the bake chamber 620 are positioned to be spaced apart from each other with the transfer chamber 630 interposed therebetween in the second direction 14. A plurality of passivation layer application chambers 610 are provided, and placed to be layered on each other in the third direction 16. Optionally, the plurality of passivation layer application chambers 610 may be provided in each of the first direction 12 and the third direction 16. A plurality of bake chambers 620 are provided, and placed to be layered on each other in the third direction 16. Optionally, the plurality of bake chambers 620 may be provided in each of the first direction 12 and the third direction 16.

The transfer chamber 630 is positioned in line with the first cooling chamber 530 of the second buffer module 500 in the first direction 12. A pre-treatment robot 632 is positioned in the transfer chamber 630. The transfer chamber 630 has a substantially squarer or rectangular shape. The pre-treatment robot 632 transfers the substrate W between the passivation layer application chamber 610, the bake chambers 620, the buffer 520 of the second buffer module 500, and a first buffer 720 of an interface module 700 to be described below. The pre-treatment robot 632 has a hand 633, an arm 634, and a support 635. The hand 633 is fixedly installed in the arm 634. The arm 634 is provided in a stretchable structure and a rotatable structure. The arm 634 is coupled to the support 635 to be linearly movable along the support 635 in the third direction 16.

The passivation layer application chamber 610 applies the passivation layer protecting the resist film upon the immersion exposure onto the substrate W. The passivation layer application chamber 610 has a housing 611, a support plate 612, and a nozzle 613. The housing 611 may have a cup shape of which an upper portion is opened. The support plate 612 is positioned in the housing 611, and supports the substrate W. The support plate 612 is provided to be rotatable. The nozzle 613 supplies a passivation solution for forming the passivation layer onto the substrate W placed on the support plate 612. The nozzle 613 may have a circular tube shape, and supply the passivation solution to the center of the substrate W. Optionally, the nozzle 613 may have a length corresponding to a diameter of the substrate W, and the ejection hole of the nozzle 613 may be provided as a slit. In this case, the support plate 612 may be provided in a fixed state. The passivation solution includes a foamed material. The passivation solution may adopt a photoresist and a material having low affinity with water. For example, the passivation solution may contain a fluorine-based solvent. The passivation layer application chamber 610 supplies the passivation solution to the central region of the substrate W while rotating the substrate W placed on the support plate 612.

The bake chamber 620 heat-treats the substrate W applied with the passivation layer. The bake chamber 620 has a cooling plate 621 or a heating plate 622. A cooling means 621 such as cooling water or a thermoelectric element is provided in the cooling plate 623. Alternatively, a heating means 622 such as the heat wire or the thermoelectric element is provided in the heating plate 624. Each of the heating plate 622 and the cooling plate 621 may be provided in one bake chamber 620. Optionally, some of the bake chambers 620 may include only the heating plate 622, and the other some may include only the cooling plate 621.

The pre-treatment module 602 includes a cleaning chamber 660, a post-exposure bake chamber 670, and a transfer chamber 680. The cleaning chamber 660, the transfer chamber 680, and the post-exposure bake chamber 670 are sequentially arranged in the second direction 14. Therefore, the cleaning chamber 660 and the post-exposure bake chamber 670 are positioned to be spaced apart from each other with the transfer chamber 680 interposed therebetween in the second direction 14. A plurality of cleaning chambers 660 are provided, and placed to be layered on each other in the third direction 16. Optionally, the plurality of cleaning chambers 660 may be provided in each of the first direction 12 and the third direction 16. A plurality of exposure-post bake chambers 670 may be provided, and placed to be layered on each other in the third direction 16. Optionally, the plurality of post-exposure bake chambers 670 may be provided in each of the first direction 12 and the third direction 16.

The transfer chamber 680 is positioned in line with the second cooling chamber 540 of the second buffer module 500 in the first direction 12 when viewed from the top. The transfer chamber 680 has a substantially squarer or rectangular shape. A post-treatment robot 680 is positioned in the transfer chamber 682. The post-treatment robot 682 transports the substrate W between the cleaning chambers 660, the post-exposure bake chambers 670, the second cooling chamber 540 of the second buffer module 500, and a second buffer 730 of the interface module 700 to be described below. The post-treatment robot 682 provided in the post-treatment module 602 may be provided in the same structure as the pre-treatment robot 632 provided in the pre-treatment module 601. The cleaning chamber 660 cleans the substrate W after the exposure process. The cleaning chamber 660 has a housing 661, a support plate 662, and a nozzle 663. The housing 661 may have a cup shape of which an upper portion is opened. The support plate 662 is positioned in the housing 661, and supports the substrate W. The support plate 662 is provided to be rotatable. The nozzle 663 supplies a cleaning solution onto the substrate W placed on the support plate 662. As the cleaning solution, water such as deionized water may be used. The cleaning chamber 660 supplies the cleaning solution to the central region of the substrate W while rotating the substrate W placed on the support plate 662. Optionally, the nozzle 663 may linearly move or rotatably move up to an edge region from the central region of the substrate W while the substrate W rotates. The post-exposure bake chamber 670 heats the substrate for which the exposure process is performed by using far-ultraviolet rays. The post-exposure bake process amplifies acid generated in the photoresist by the exposure by heating the substrate W to complete a property change of the photoresist. The post-exposure bake chamber 670 has the heating plate 672. A heating means 674 such as the heat wire or the thermoelectric element is provided in the heating plate 672. The post-exposure bake chamber 670 may further include the cooling plate 671 therein. A cooling means 671 such as cooling water or a thermoelectric element is provided in the cooling plate 673. Further, optionally, a bake chamber having only the cooling plate 671 may be further provided. As described above, in the exposure pre and post-treatment module 600, the pre-treatment module 601 and the post-treatment module 602 are provided to be completely separated from each other. Further, the transfer chamber 630 of the pre-treatment module 601 and the transfer chamber 680 of the post-treatment module 602 are provided in the same size to be provided to completely overlap with each other when viewed from the top. Further, the passivation layer application chamber 610 and the cleaning chamber 660 are provided in the same size to be provided to completely overlap with each other when viewed from the top. Further, the bake chamber 620 and the post-exposure bake chamber 670 are provided to completely overlap with each other when viewed from the top.

The interface module 700 transfers the substrate W between the exposure pre and post-treatment module 600 and the exposure apparatus 1000. The interface module 700 includes a frame 710, a first buffer 720, a second buffer 730, and an interface robot 740. The first buffer 720, the second buffer 730, and the interface robot 740 are positioned in the frame 710. The first buffer 720 and the second buffer 730 are spaced apart from each other by a predetermined distance, and placed to be stacked on each other. The first buffer 702 is placed to be higher than the second buffer 730. The first buffer 720 is positioned at a height corresponding to the pre-treatment module 601, and the second buffer 730 is placed at a height corresponding to the post-treatment module 602. When viewed from the top, the first buffer 720 is placed in line with the transfer chamber 630 of the pre-treatment module 601 in the first direction 12, and the second buffer 730 is positioned to be placed in line with the transfer chamber 630 of the post-treatment module 602 in the first direction.

The interface robot 740 is positioned to be spaced apart from the first buffer 720 and the second buffer 730 in the second direction 14. The interface robot 740 transports the substrate W between the first buffer 720, the second buffer 730, and the exposure apparatus 1000. The interface robot 740 has a substantially similar structure to the second buffer robot 560.

Before the substrates W for which the process is performed in the pre-treatment module 601 are moved to the exposure apparatus 1000, the first buffer 720 temporarily keeps the substrates W. In addition, before the substrates W for which the process is performed in the exposure apparatus 1000 are moved to the pre-treatment module 602, the second buffer 730 temporarily keeps the substrates W. The second buffer 720 includes a housing 721 and a plurality of supports 722. The supports 722 are placed in the housing 721, and provided to be spaced apart from each other in the third direction 16. One substrate W is placed on each support 722. The housing 721 has an opening (not illustrated) in the direction in which the interface robot 740 is provided and the direction in which the pre-treatment robot 632 is provided so that the interface robot 740 and the pre-treatment robot 632 may load or unload the substrate W on or from the support 722. The second buffer 730 has a substantially similar structure to the first buffer 720. However, the housing 4531 of the second buffer 730 has an opening (not illustrated) in a direction in which the interface robot 740 is provided and a direction in which the pre-treatment robot 682 is provided. Only the buffers and the robot may be provided in the interface module as described above without providing a chamber that performs a predetermined process for the wafer W.

Next, an example of performing the process by using substrate treating facility 1 will be described.

The cassette 20 storing the substrates W is placed on the mounting table of the load port 100. The door of the cassette 20 is opened by a door opener. The index robot 220 takes out the substrate W from the cassette 20, and transports the substrate W to the second buffer 330.

The first buffer robot 360 transports the substrate W kept in the second buffer 30 to the first buffer 320. The application unit robot 432 takes out the substrate W from the first buffer 320, and transports the substrate W to the bake chamber 420 of the application module 401. The bake chamber 420 sequentially performs pre bake and cooling processes. The application unit robot 432 takes out the substrate W from the bake chamber 420, and transports the substrate W to the resist application chamber 410. The resist application chamber 410 applies the photoresist onto the substrate W. Thereafter, when the photoresist is applied onto the substrate W, the application unit robot 432 takes out the substrate W from the resist application chamber 410, and transports the substrate W to the bake chamber 420 from the resist application chamber 410. The bake chamber 420 performs a soft bake process for the substrate W.

The application unit robot 432 takes out the substrate W from the bake chamber 420, and transports the substrate W to the first cooling chamber 530 of the second buffer module 500. The cooling process is performed for the substrate W in the first cooling chamber 530. The substrate W for which the process is performed in the first cooling chamber 530 is transported to the edge exposure chamber 550 by the second buffer robot 560. The edge exposure chamber 550 performs a process of exposing the edge region of the substrate W. The substrate W for which the process is completed in the edge exposure chamber 550 is transported to the buffer 520 by the second buffer robot 560.

The pre-treatment robot 632 takes out the substrate W from the buffer 520, and transports the substrate W to the passivation layer application chamber 610 of the pre-treatment module 601. The passivation layer application chamber 610 applies the passivation layer onto the substrate W. Thereafter, the pre-treatment robot 632 transports the substrate W from the passivation layer application chamber 610 to the bake chamber 620. The bake chamber 620 performs heat-treatment such as heating and cooling for the substrate W.

The pre-treatment robot 632 takes out the substrate W from the bake chamber 620, and transports the substrate W to the first buffer 720 of the interface module 700. The interface robot 740 transports the substrate W from the first buffer 720 to the exposure apparatus 900. The exposure apparatus 900 performs the exposure, e.g., the immersion exposure process for a treated surface of the substrate W. When the exposure process is completed for the substrate W in the exposure apparatus 900, the interface robot 740 transports the substrate W from the exposure apparatus 900 to the second buffer 730.

The post-treatment robot 682 takes out the substrate W from the second buffer 730, and transports the substrate W to the cleaning chamber 660 of the post-treatment module 602. The cleaning chamber 660 performs the cleaning process by supplying the cleaning solution to the surface of the substrate W. When cleaning the substrate W using the cleaning solution is completed, the post-treatment robot 682 immediately takes out the substrate W from the cleaning chamber 660 and exposes the substrate W, and then transports the substrate to the bake chamber 670. The cleaning solution attached onto the substrate W is removed by heating the substrate W in the heating plate 672 of the post-exposure bake chamber 570, and simultaneously with this, the acid generated in the photoresist is amplified to complete the property change of the photoresist. The post-treatment robot 682 takes out the substrate W from the post-exposure bake chamber 670, and transports the substrate W to the second cooling chamber 540 of the second buffer module 500. The second cooling chamber 540 performs cooling of the substrate W.

The development unit robot 482 takes out the substrate W from the second cooling chamber 540, and transports the substrate W to the bake chamber 470 of the development module 402. The bake chamber 470 sequentially performs post bake and cooling processes. The development unit robot 482 takes out the substrate W from the bake chamber 470, and transports the substrate W to the development chamber 460. The development chamber 460 performs the development process by supplying the development solution onto the substrate W. Thereafter, the development unit robot 482 transports the substrate W from the development chamber 460 to the bake chamber 470. The bake chamber 470 performs the hard bake process for the substrate W. The development unit robot 482 takes out the substrate W from the bake chamber 470, and transports the substrate W to the cooling chamber 350 of the first buffer module 300. The cooling chamber 350 performs the process of cooling the substrate W. The index robot 360 transports the substrate W from the cooling chamber 350 to the cassette 20. Unlike this, the development unit robot 492 may take out the substrate W from the bake chamber 470 and transport the substrate W to the second buffer 330 of the first buffer module 300, and then the substrate W may be transported to the cassette 20 by the index robot 360.

Figure 5:
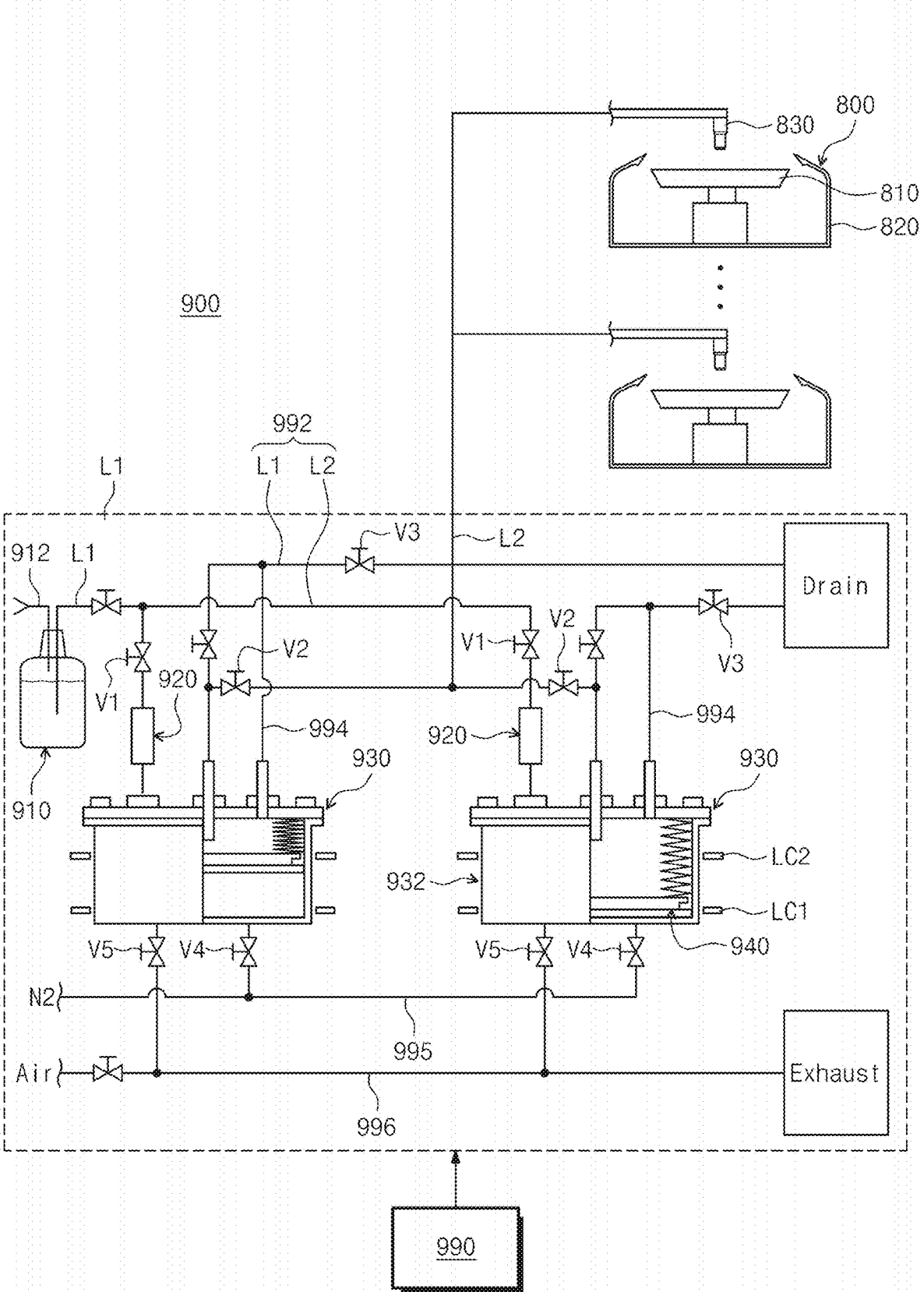
FIG. 5 is a diagram for describing a treatment solution supply apparatus for supplying a treatment solution to each of a resist application chambers.

FIG. 5 is a diagram for describing a treatment solution supply apparatus for supplying a treatment solution to each of a resist application chambers.

In the exemplary embodiment, it is described that the treatment solution supply apparatus 900 supplies the treatment solution used for the application process to each of the resist application chambers, but the present invention is not limited thereto, and the treatment solution supply apparatus 900 is applicable to all solution treating apparatuses that treat the substrate surface by using the treatment solution. In the resist application chamber, a solution treatment apparatus 800 may be provided, which performs a process of pre-setting the substrate with a thinner composition, a process of applying the photoresist, and a process of cleaning a substrate edge with the thinner composition. Each solution treatment apparatus 800 may include a substrate support unit 810, a treatment container 820, and a nozzle 830.

Referring to FIG. 5, the treatment solution supply apparatus 900 may include a bottom 910 storing the treatment solution, a dissolved gas extraction nozzle 920, a pump unit 930, a treatment solution supply pipe 992, and a control unit 990.

The bottle 910 is filled with the treatment solution, and connected to a first inert gas supply line 912 and a first supply line L1. Inert gas (helium gas or nitrogen gas) may be supplied to the bottle 910 through a regulator in order to make an inside of the bottle 910 through the first inert gas supply line 912, and the internal treatment solution may be moved to the dissolved gas extraction nozzle 920 through the first supply line L1 by a relative pressure. For example, the treatment solution may be a resist solution, a thinner solution, a rinse solution, pure water, etc.

In the dissolved gas extraction nozzle 920, the dissolved gas in the treatment solution may be separated. The dissolved gas extraction nozzle 920 may be provided on the first supply line L1. Preferably, the dissolved gas extraction nozzle 920 may be positioned close to the pump unit 930. The first supply line L1 is connected to the pump unit 930.

The pump unit 930 may temporarily store the treatment solution, and supply the treatment solution (the treatment solution from which the dissolved gas is removed) to the nozzle 830 of each of the solution treating apparatuses. The first supply line L1, a s second supply line L2, and a vent line

994 may be connected to the pump unit 930. The second supply lines L2 may be connected to the nozzles 830 of the respective solution treatment apparatuses. The pump unit 930 may be provided in parallel to a treatment solution supply pipe 992. Two pump units may alternately supply the treatment solution. Since configurations of the pump units 930 are the same as each other, only one pump unit is described.

Figure 6:
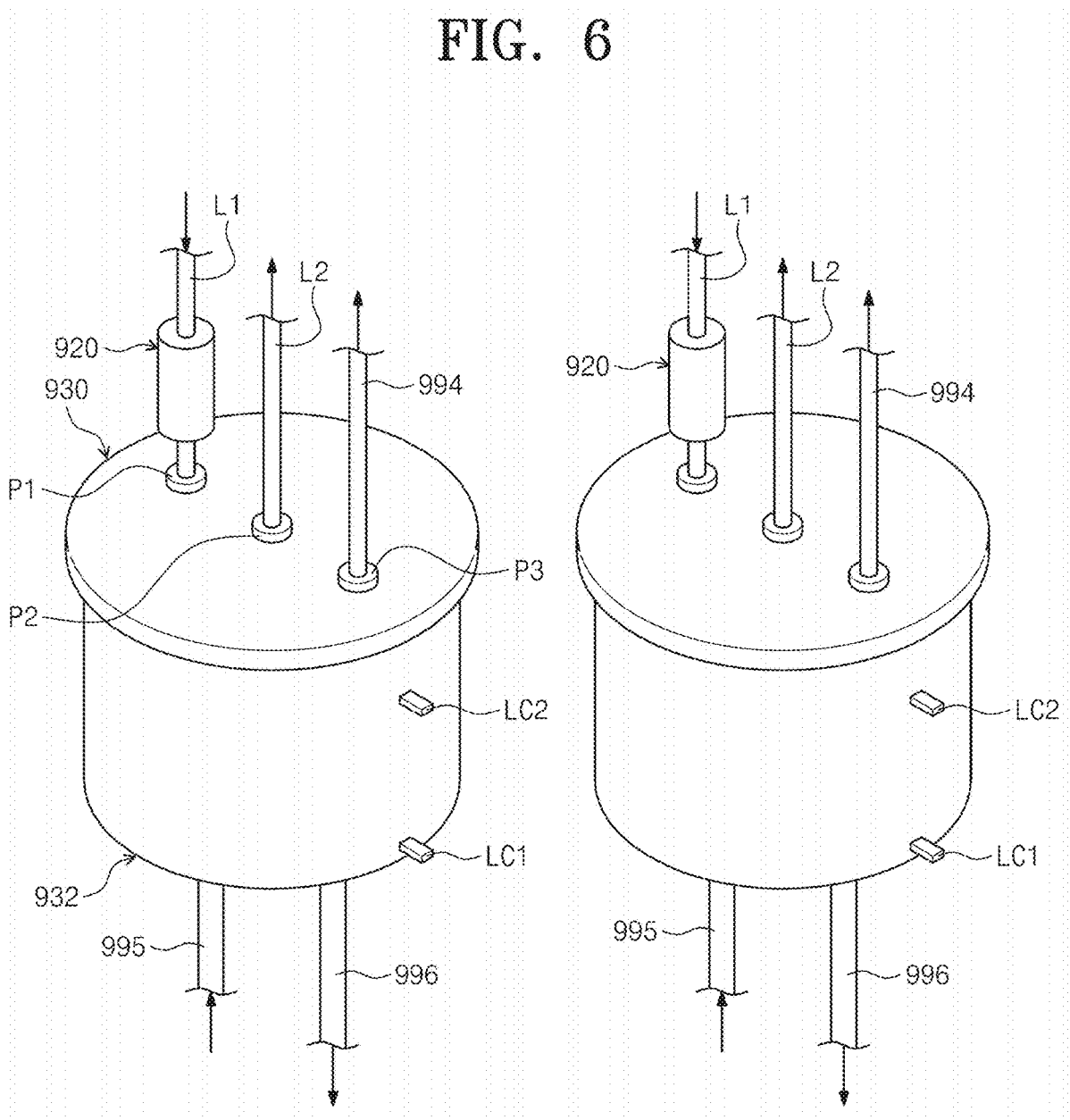
FIGS. 6 and 7 are diagrams for describing a pump unit.
Figure 7:
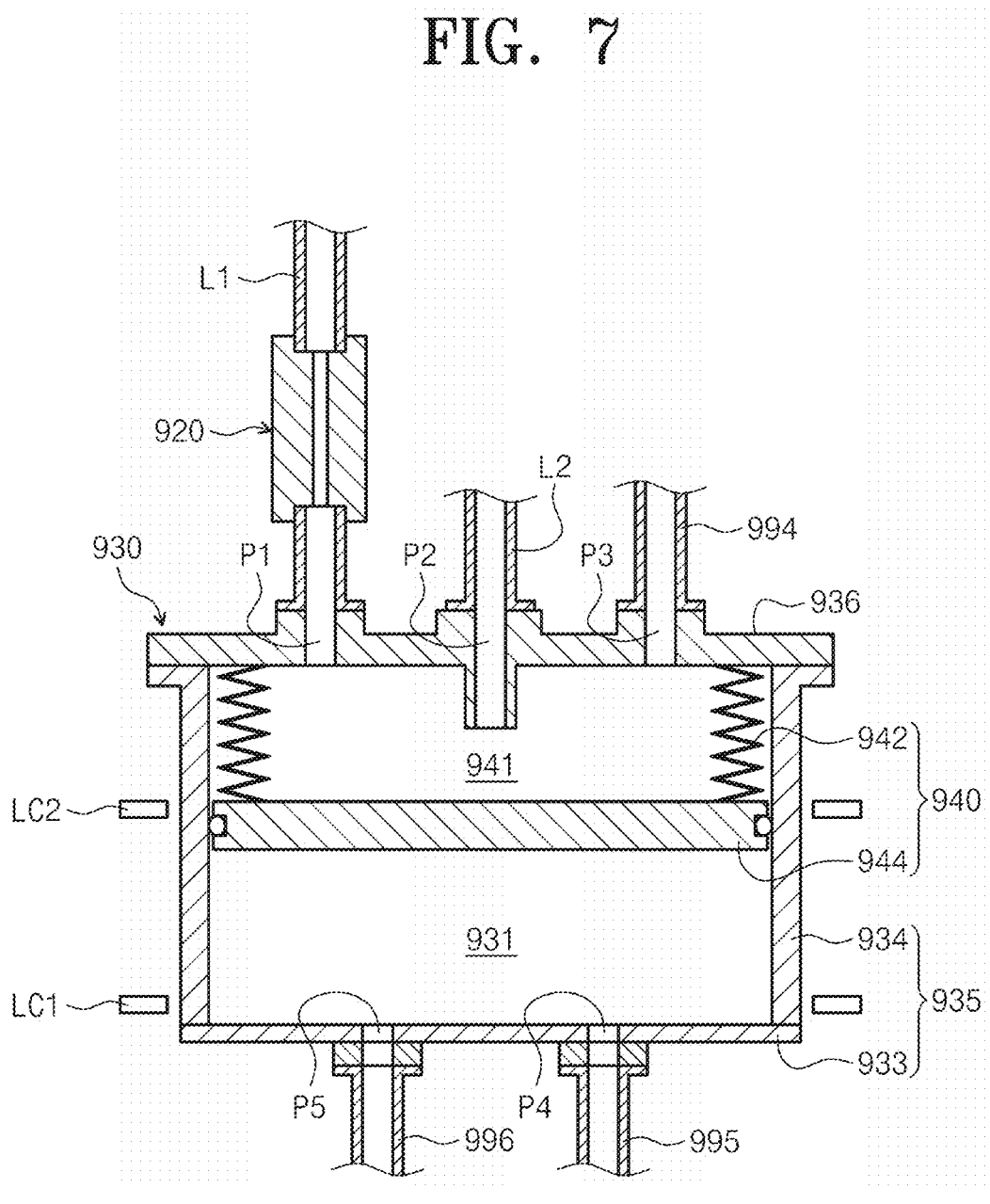

FIGS. 6 and 7 are diagrams for describing the pump unit.

Referring to FIGS. 5 to 7, the pump unit 930 may include a pump case 932 and a bellows pump 940.

The pump case 932 may include a case 935 having a bottom 933 and a cylindrical side wall 934, and a cover 936 covering an opened top surface of the case 935. The bellows pump 940 is positioned within the pump case 932. A pressurization port P connected to a pressurizing line 995 and a decompression port P5 connected to a decompressing line 996 may be provided on the bottom 933 of the pump case 932. The cover 936 provides a space accommodating the bellows pump 940 jointly with the case 935. An introduction port P1, an ejection port P2, and a vent port P3 are provided in the cover 936.

The first supply line L1 is connected to the introduction port P1. The dissolved gas extraction nozzle 920 may be provided on the first supply line L1 to be adjacent to the introduction port P1. The treatment solution is introduced into a storage space of the bellows pump 940 through the dissolved gas extraction nozzle 920 and the introduction port P1 during an expiation operation of the bellows pump 940.

The second supply line L2 is connected to the ejection port P2. The treatment solution stored in the storage space 941 of the bellows pump 940 may be supplied to the second supply line L2 through the ejection port P2 during a contraction operation of the bellows pump 940. Meanwhile, it is preferable that an inlet (lower end) of the ejection port P2 is provided to protrude from the bottom of the cover 936. The inlet (lower end) of the ejection port P2 is positioned at a different height from an let of the vent port P3. The inlet of the ejection port P2 is positioned below the inlet of the vent port P3 in order to prevent the bubble which remains at an upper portion of the storage space 41 is discharged through the ejection port P2.

The bellows pump 940 may have one end airtightly fixed to the pump case 932 and provide the storage space 941 from the pump case 932, and may be contracted or expanded by a pressure control fluid provided to a pressure chamber 931 of the pump case 932. The pressure chamber 931 may be a space surrounded by the case 935 and the movement plate 944, and may be pressurized or depressurized by a pressurizing gas (e.g., N2 gas) and a depressurizing gas (e.g., air).

The bellows pump 940 may include the movement plate 944 and a bellows 942. The movement plate 944 has a shape corresponding to an inner wall surface of the side wall 934. The movement plate 944 may reciprocate in a direction in which the side wall 934 extends. The bellows 942 is stretchable in the direction in which the side wall 934 extends in the case 935.

One end side of the bellows 942 is attached to a surface of a side in the cover 936 facing the bottom 933. The other end side of the bellows 942 is attached to a surface of a side in the movement plate 933 facing the cover 936. Therefore, a volume of the bellows pump 940 may be changed according to a location of the movement plate 944. A space surrounded by the cover 936, the bellows 942, and the movement plate 944 is the storage space 941 capable of storing the treatment solution, and a size of the storage space 941 means the volume of the bellows pump 940.

The pump unit 930 may include a first sensing unit LC1 and a second sensing unit LC2. The first sensing unit LC1 is positioned close to the bottom 933 of the pump case 932, and senses the movement plate 944 which descends up to a first height. When the movement plate 944 moves up to the first height at which the first sensing unit LC1 is positioned, the treatment solution is almost fully filled in the bellows pump 940. The second sensing unit LC2 is positioned close to the cover 936 of the pump case 932, and senses the movement plate 944 which ascends up to a second height. When the movement plate 944 moves up to the second height at which the second sensing unit LC2 is positioned, the treatment solution is almost empty in the bellows pump 940. The control unit 990 controls the operation of the pump unit 930. The control unit 990 may control valves V1, V2, V3, V4, and V5 on a line connected to the pump unit 930 so as to achieve an operation of storing a chemical solution in the pump unit 930 through the dissolved gas extraction nozzle 920, a bubble discharging operation of discharging the bubble separated from the treatment solution in the pump unit 930 after the storing operation, and an ejection operation of ejecting the chemical solution from which the bubble is removed from the pump unit 930 after the bubble discharging operation. When the bubble discharging operation and the ejection operation are executed, the volume of the pump unit is reduced.

Figure 8:
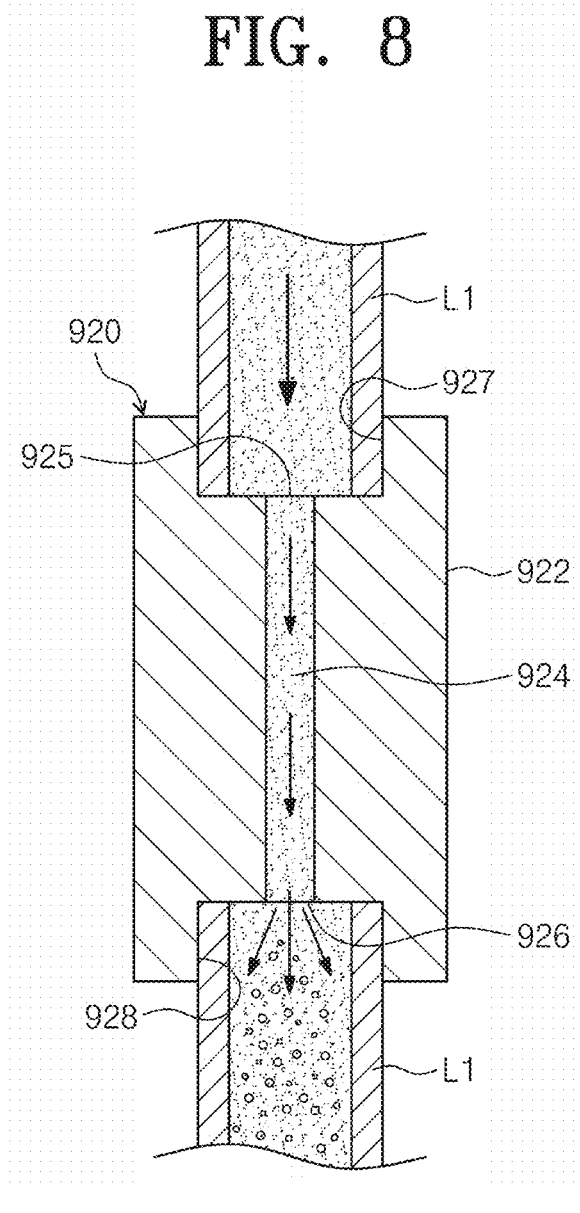
FIGS. 8 and 9 are diagrams for describing a dissolved gas extraction nozzle.
Figure 9:
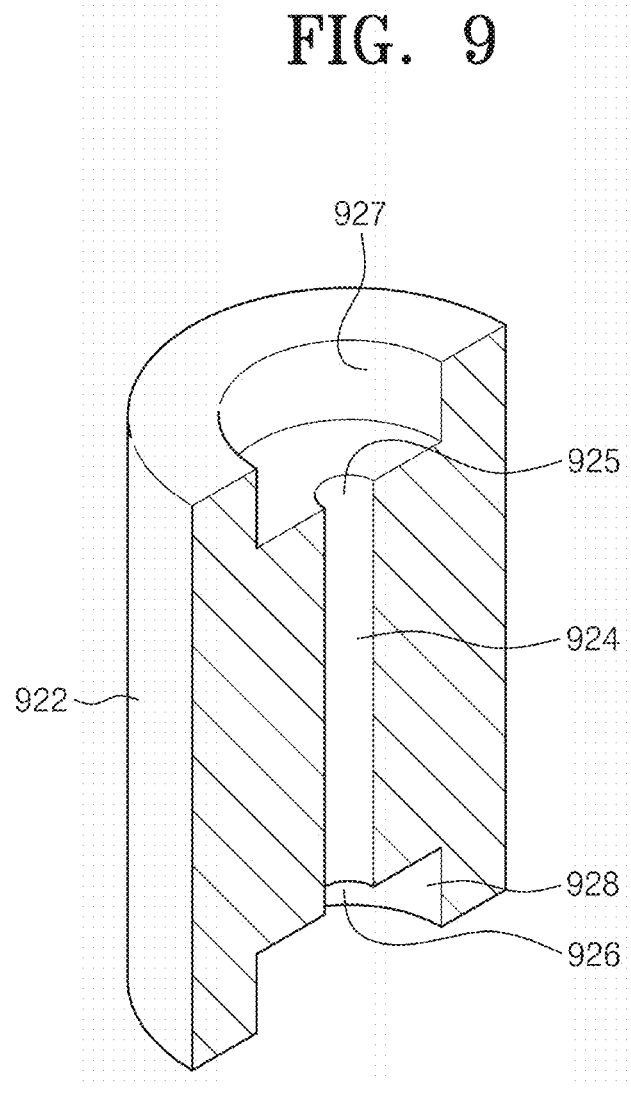

FIGS. 8 and 9 are diagrams for describing a dissolved gas extraction nozzle.

Referring to FIGS. 7 to 9, the dissolved bas extraction nozzle 920 is a nozzle that extracts a dissolved gas from the treatment solution in the form of an exhaustable bubble. The dissolved gas extraction nozzle 920 may include a nozzle body 922 having a central flow path 924 in which the chemical solution flows therein. The central flow path 924 includes an introduction hole 925 into which the chemical solution is introduced at one side and an ejection hole 926 from which the chemical solution is ejected at the other side. The ejection hole 926 has a cross-sectional area relatively smaller than a cross-sectional area of the first supply line L1 which is a pipe connected to the ejection hole 926 so as to extract the dissolved gas in the chemical solution through the cavitation phenomenon. For reference, the introduction hole and the ejection hole have the same cross-sectional area as the central flow path.

For example, there is a scheme of using a cavitation phenomenon (a phenomenon in which the bubble is generated due to a rapid pressure reduction of the dissolved gas which is melt in the chemical solution) in which a flow speed of a predetermined flow rate of treatment solution increases in the process in which the treatment solution passes through the dissolved gas ejection nozzle 920 to be generated at a vapor pressure or less. The dissolved gas ejection nozzle 920 extracts the dissolved gas in the treatment solution in the form of the bubble through the cavitation phenomenon when the treatment solution is ejected from the ejection hole 926.

In more detail, the treatment solution is discharged through the ejection hole 926 of the central flow path 924. The flow speed increases while the treatment solution passes through the central flow path 924, and a dynamic pressure of the treatment solution rapidly increases and a static pressure rapidly decreases, and when the ejection hole 926 passes, a cross-sectional area of the flow path rapidly increases, so the flow speed decreases, and the dynamic pressure of the treatment solution rapidly decreases and the static pressure rapidly increases. When a rapid pressure change of the treatment solution occurs, the cavitation phenomenon occurs, and while the dissolved gas in the treatment solution is extracted in the form of the bubble, the dissolved gas is separated from the treatment solution. The treatment solution from which the bubble and the dissolved gas extracted while passing through the dissolved gas extraction nozzle 920 is introduced into the storage space 941 of the bellows pump 940.

As described above, the dissolved gas extraction nozzle 920 extracts the dissolved gas from a dissolved gas extraction nozzle in the form of the bubble by using a cavitation phenomenon to semi-permanently use the present invention, so maintenance cost is not separately generated.

FIG. 10 is a flowchart for describing a method for removing a bubble in the treatment solution supply apparatus.

Referring to FIG. 10, the method for removing a bubble in the treatment solution supply apparatus 900 may include a bubble extracting step (S100), a treatment solution storing step (S200), a stabilization step (S300), a bubble discharging step (S400), and a treatment solution ejecting step (S500).

Figure 11:
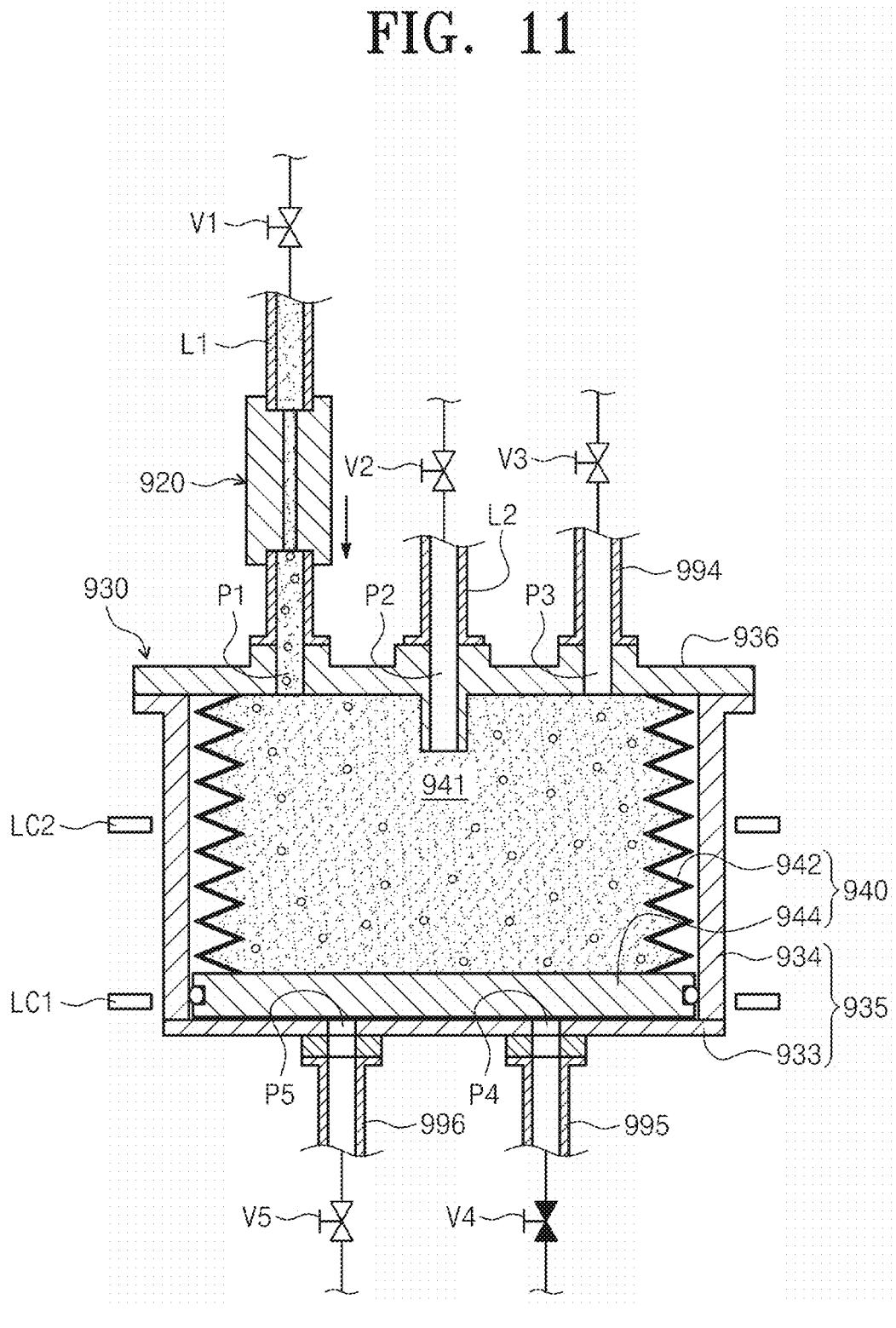
FIG. 11 is a diagram illustrating a pump unit operation in a bubble extracting step and a treatment solution storing step.

Referring to FIG. 11, in the extracting step (S100), the treatment solution passes through the dissolved gas extraction nozzle 920 and in this process, the dissolved gas is extracted in the form of the bubble. The chemical solution in which the dissolved gas is extracted in the form of the bubble is stored in the storage space 941 of the pump unit 930. The extracting step (S100) and the storing step (S200) may be consecutively performed. In the extracting step (S100) and the storing step (S200), the valve V5 on the depressurizing line 996 and the valve V1 on the first supply line L1 are opened. The pressure chamber 931 of the pump unit 930 is depressurized by the depressurizing gas and the movement plate 944 moves toward the bottom 933 of the case 935. Therefore, the treatment solution is introduced into the bellows pump while the dissolved gas is separated through the dissolved gas extraction nozzle 920.

Figure 12:
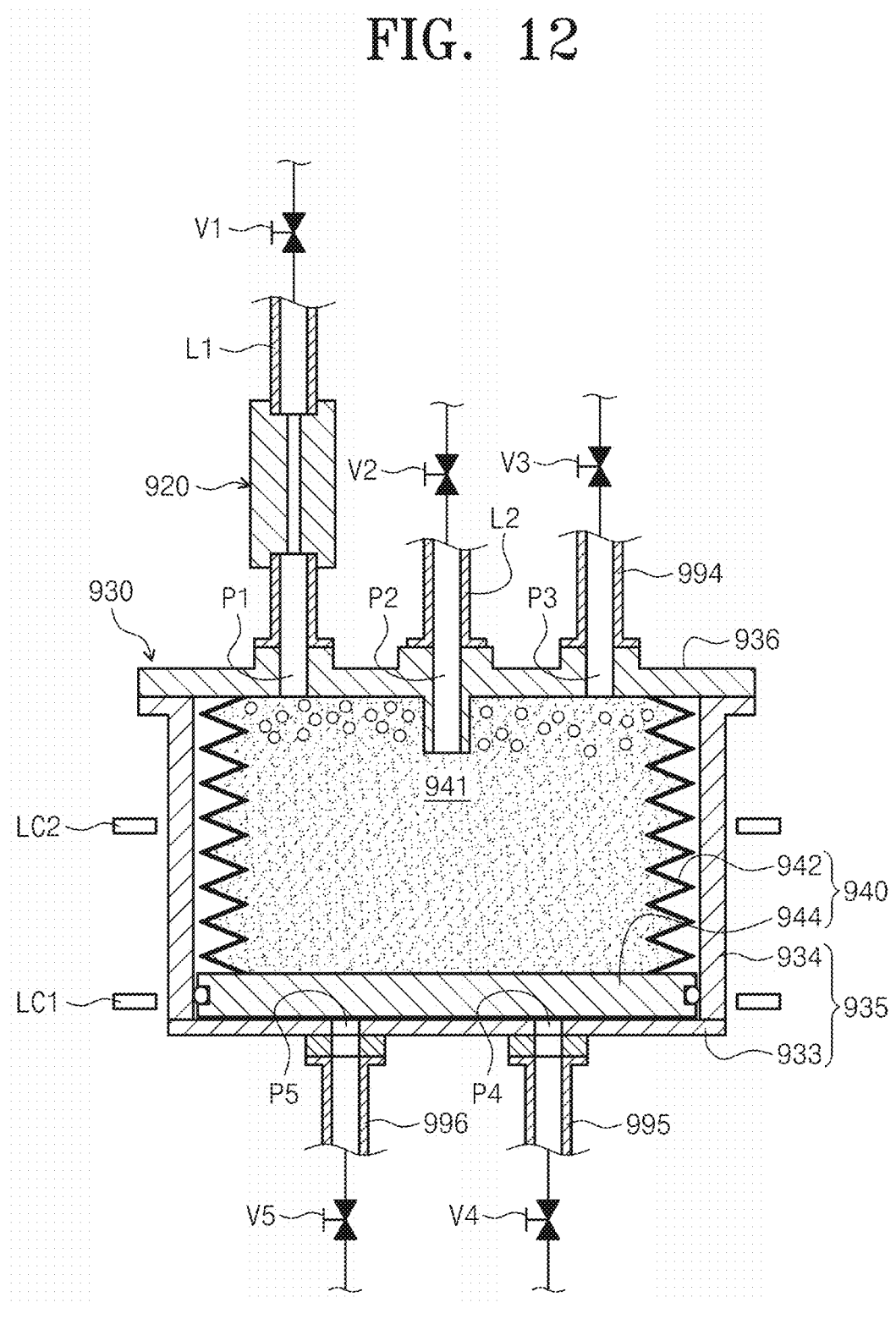
FIG. 12 is a diagram illustrating the pump unit operation in a stabilization step.

Referring of FIG. 12, the stabilization step (S300) is a step of waiting so that the bubble is separated from the treatment solution and collected at the upper portion of the storage space before removing the bubble. For example, the stabilization step may be preferably 30 seconds or more. In the stabilization step, all valves are opened.

Figure 13:
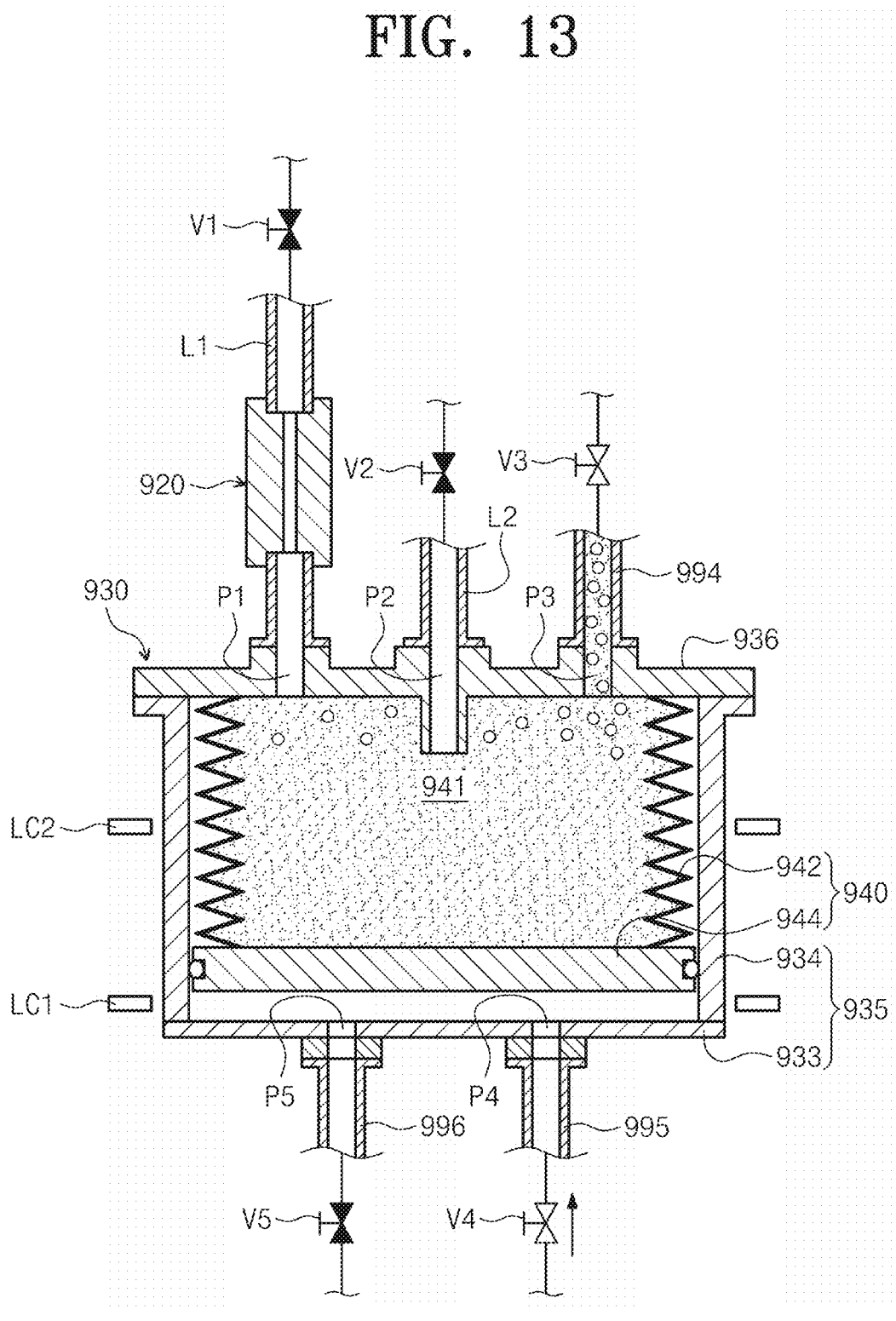
FIG. 13 is a diagram illustrating the pump unit operation in a bubble discharging step.

Referring to FIG. 13, in the bubble discharging step (S400), the bubble separated from the treatment solution is discharged from the storage space 941. In the bubble discharging step (S400), the valve V4 on the pressurizing line 995 and the valve V3 on the vent line 994 are opened. The pressure chamber 931 of the pump unit 930 is pressurized by the pressurizing gas and the movement plate 944 moves toward the cover 936. Therefore, bubbles collected at a top layer of the storage space 941 are drained through the vent line 994. The bubble discharging step (S400) is performed for a very short time just before the treatment solution ejecting step. For example, when the treatment solution ejecting step is performed for approximately 2 hours, the bubble discharging step is performed only for a short time of approximately 2 to 3 seconds.

Figure 14:
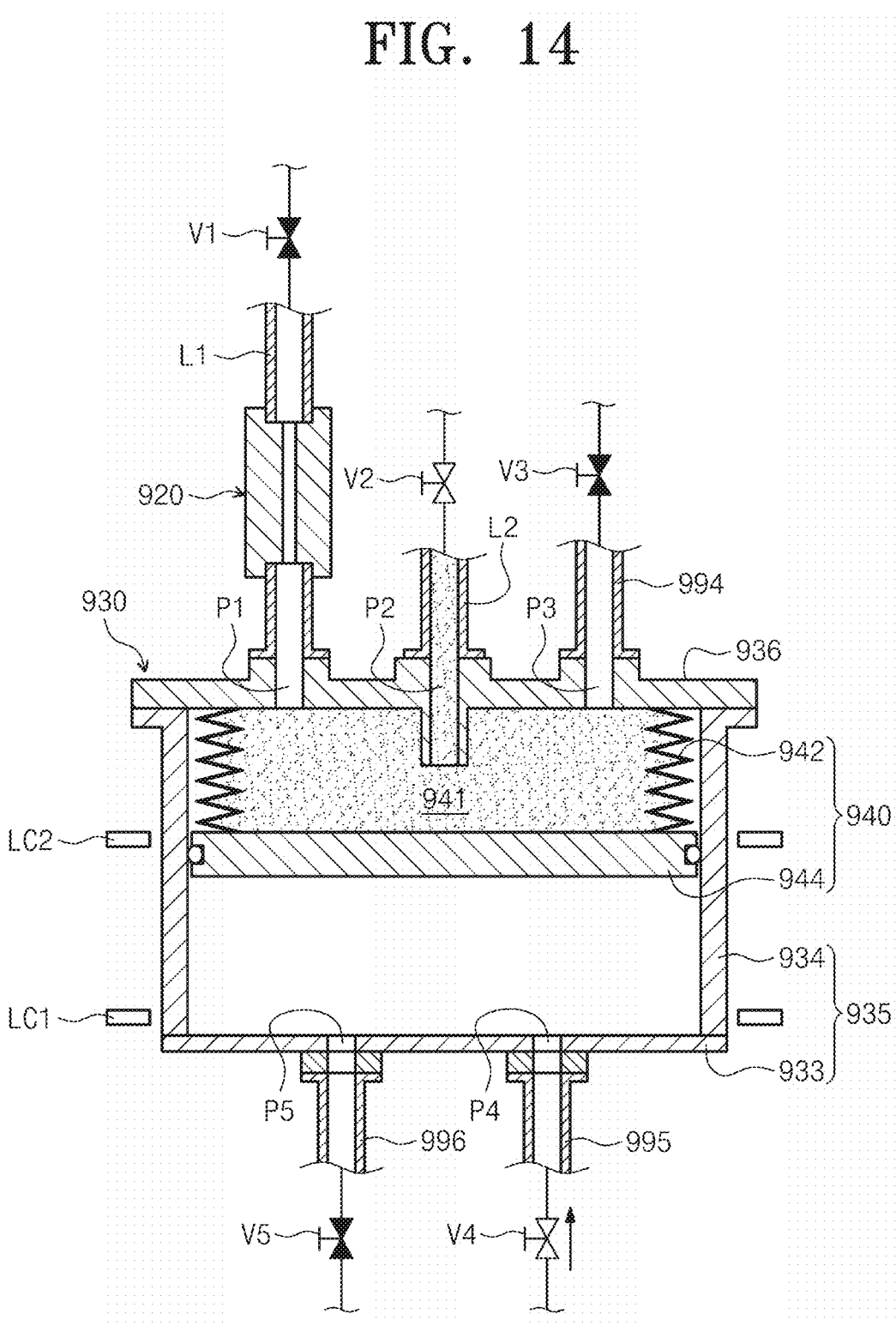
FIG. 14 is a diagram illustrating the pump unit operation in a treatment solution ejecting step.

Referring to FIG. 14, in the treatment solution ejecting step (S500), the treatment solution from which the bubble is removed is ejected from the pump unit 930. In the treatment solution ejecting step (S500), the valve V4 on the pressurizing line 995 and the valve V2 on the second supply line L2 994 are opened, and the valve V3 on the vent line 994 is opened. The pressure chamber 931 of the pump unit 930 is pressurized by the pressurizing gas and the movement plate 944 moves toward the cover 936. Therefore, the treatment solution in the storage space 941 flows to the second supply line L2 through the ejection port P2. The bubble discharging step (S400) and the treatment solution ejecting step (S500) are consecutively performed. It is the same that the pressurizing gas is supplied to the pressure chamber 931 through the pressurizing line 995, and it is different that on/off of the valve V3 on the vent line 994 and the valve 2 on the second supply line L2 is just changed.

The treatment solution supply apparatus 900 having the above-described configuration may extract the dissolved gas from the dissolved gas extraction nozzle 920, and separate and remove the bubble from the pump unit 930, and then supply the treatment solution. In particular, the dissolved gas extraction nozzle 920 may be disposed not at the front end of the nozzle but at the front end (supply portion) of the pump unit 930. Therefore, spatial and cost reduction can be expected as compared with the related art in which a degassing apparatus is individually disposed on a supply line connected to the nozzle.

Figure 15:
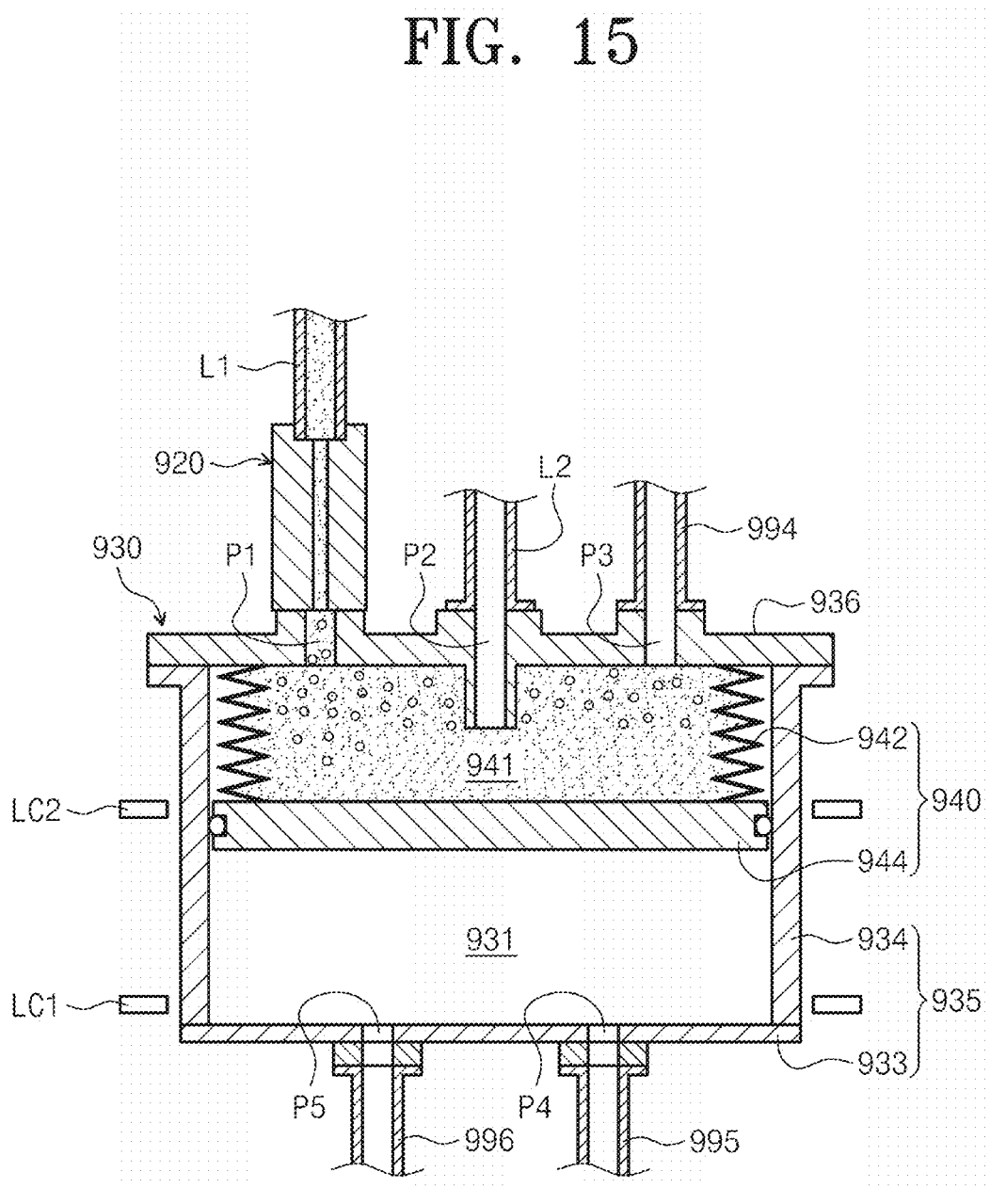
FIG. 15 is a diagram illustrating a modified example of a dissolved gas extraction nozzle.

FIG. 15 is a diagram illustrating a modified example of a dissolved gas extraction nozzle. As illustrated in FIG. 15, the dissolved gas extraction nozzle 920 may be installed so that the ejection hole is directly connected to the introduction port P1 of the pump unit 930.

The above exemplary embodiments are presented to help understand the present invention, and it should be understood that the scope of the present invention is not limited, and that various modified exemplary embodiments belong to the scope of the present invention. The technical protection scope of the protection of the present invention should be determined by the technical idea of the claim, and it should be understood that the technical protection scope of the present invention is not limited to the literary description of the claim itself, but actually influences the invention of the invention of category of a uneven technical value.

What is claimed is:

1. An equipment for treating a substrate, the equipment comprising:

a nozzle configured to supply a chemical solution to a substrate; and a chemical solution supply apparatus configured to supply the chemical solution to the nozzle, wherein the chemical solution supply apparatus includes a pump member, an extraction nozzle in a flow path and configured to introduce the chemical solution into the pump member and spray the chemical solution, and a control unit configured to control an operation of the pump member, the controlling of the operation including selectively adjusting an internal volume of the pump member, wherein the extraction nozzle includes a nozzle body defining a central flow path through which the chemical solution flows formed therein, and the central flow path having a first cross-sectional area that is smaller than a second cross-sectional area of a pipe connected to the nozzle body such that a dissolved gas in the chemical solution is extracted in the form of bubbles, wherein the control unit is further configured to store the chemical solution in the pump member through the extraction nozzle, discharge the bubbles separated from the chemical solution in the pump member following the storing of the chemical solution, and eject the chemical solution from which the bubbles are removed from the pump member following the discharging of the bubbles, and wherein the control unit is configured to reduce the internal volume of the pump member by pressurizing the pump member while discharging the bubbles and ejecting the chemical solution.

2. The equipment of claim 1, wherein the extraction nozzle includes a nozzle body having a central flow path through which the chemical solution flows formed therein, the central flow path includes an introduction hole through which the chemical solution is introduced at a first side and an ejection hole through which the chemical solution is ejected at a second side, and the ejection hole has a first cross-sectional area that is smaller than a second cross-sectional area of a pipe connected to the ejection hole such that a dissolved gas in the chemical solution is extracted in the form of bubbles through a cavitation phenomenon.

3. The equipment of claim 2, wherein a third cross-sectional area of the central flow path is the same as the first cross-sectional area of the ejection hole and a fourth cross-sectional area of the introduction hole.

4. The equipment of claim 2, wherein the nozzle body includes a first connection portion for connecting the pipe to the introduction hole, and a second connection portion for connecting the pipe to the ejection hole.

5. The equipment of claim 2, wherein the ejection hole of the nozzle body is directly connected to an introduction port of the pump member.

6. The equipment of claim 1, wherein the pump member includes a pump case, and a bellows pump having one end airtightly fixed to the pump case, the bellows pump being configured to contract or expand a storage space of the pump case using a pressure control fluid.

7. The equipment of claim 6, wherein the pump case is configured to allow an ejection port to reject the chemical solution into the storage space.

8. An equipment for treating a substrate, the equipment comprising:

a nozzle configured to supply a chemical solution to a substrate; and a chemical solution supply apparatus configured to supply the chemical solution to the nozzle, wherein the chemical solution supply apparatus includes a pump member, an extraction nozzle in a flow path and configured to introduce the chemical solution into the pump member, and a control unit configured to control an operation of the pump member, the controlling of the operation including selectively adjusting an internal volume of the pump member, wherein the extraction nozzle includes a nozzle body defining a central flow path through which the chemical solution flows formed therein, and the central flow path having a first cross-sectional area that is smaller than a second cross-sectional area of a pipe connected to the nozzle body such that a dissolved gas in the chemical solution is extracted in the form of bubbles, wherein the control unit is further configured to store the chemical solution in the pump member through the extraction nozzle, discharge the bubbles separated from the chemical solution in the pump member following the storing of the chemical solution, and eject the chemical solution from which the bubbles are removed from the pump member following the discharging of the bubbles, and wherein the control unit further includes a stabilization operation that allows the bubbles to be separated from the chemical solution between the storing of the chemical solution and the discharging of the bubbles.

\* \* \* \* \*